(12) United States Patent  (10) Patent No.: US 8,454,152 B2
Kobayashi et al.  (45) Date of Patent: Jun. 4, 2013

(54) INK JET RECORDING DEVICE AND INK JET RECORDING METHOD

(75) Inventors: Hideyuki Kobayashi, Tokyo (JP); Masahiro Makita, Tokyo (JP); Shouhei Kuramochi, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 221 days.

(21) Appl. No.: 12/997,633

(22) PCT Filed: May 18, 2009

(86) PCT No.: PCT/JP2009/059124
§ 371 (c)(1),
(2), (4) Date: Dec. 13, 2010

(87) PCT Pub. No.: WO2009/157262
PCT Pub. Date: Dec. 30, 2009

(65) Prior Publication Data
US 2011/0096132 A1  Apr. 28, 2011

(30) Foreign Application Priority Data

Jun. 23, 2008 (JP) ................................. 2008-162987

(51) Int. Cl.
*B41J 2/01* (2006.01)
*B41J 2/155* (2006.01)
(52) U.S. Cl.
USPC ........................................... 347/102; 347/42

(58) Field of Classification Search
USPC ......................................................... 347/102
See application file for complete search history.

(56) References Cited

U.S. PATENT DOCUMENTS

| | | | |
|---|---|---|---|
| 7,048,368 B2 * | 5/2006 | Hirai | 347/102 |
| 2004/0189770 A1 | 9/2004 | Hintermann | |
| 2005/0219293 A1 | 10/2005 | Kachi | |
| 2006/0203024 A1 * | 9/2006 | Kusunoki | 347/15 |
| 2007/0046719 A1 | 3/2007 | Yamanobe et al. | |

FOREIGN PATENT DOCUMENTS

| | | |
|---|---|---|
| EP | 1 818 178 | 8/2007 |
| JP | 2003-191594 | 7/2003 |
| JP | 2004-114688 | 4/2004 |
| JP | 2004-276556 | 10/2004 |
| JP | 2005-280346 | 10/2005 |
| JP | 2006-248042 | 9/2006 |
| JP | 2007-230182 | 9/2007 |
| JP | 2008-023980 | 2/2008 |

* cited by examiner

*Primary Examiner* — Omar Rojas
(74) *Attorney, Agent, or Firm* — Lucas & Mercanti, LLP

(57) ABSTRACT

Provided are an inkjet recording device and an inkjet recording method for providing an image wherein concentration nonuniformity is reduced with less ink bleed between inks of different colors, in high speed multicolor printing of single path system. In the device and the method, a conditional expression of $0.6 \leq R/R0 \leq 0.9$ is satisfied, where, R is a dot radius of a second ink jetted on a first ink which is jetted on the recording medium and semi-cured by a beam applied, and R0 is a dot radius of the second ink directly jetted on the recording medium.

17 Claims, 5 Drawing Sheets

FIG. 4a  FIG. 4b  FIG. 4c
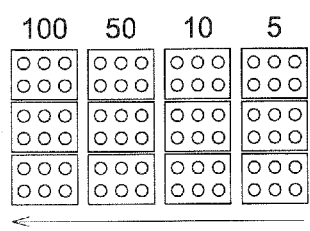 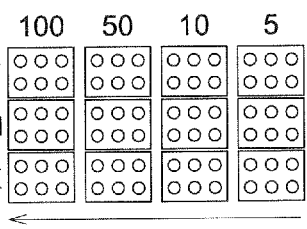 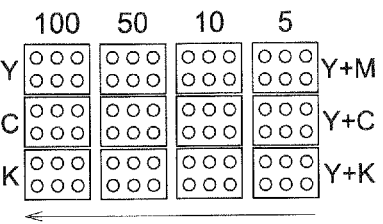
FIG. 5a
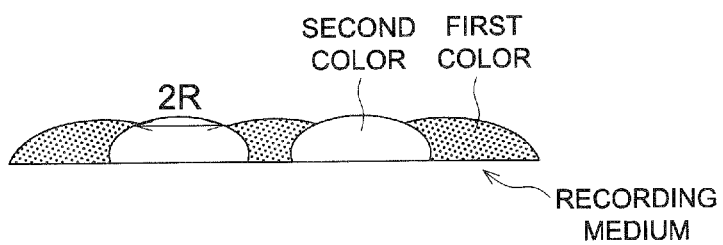
FIG. 5b
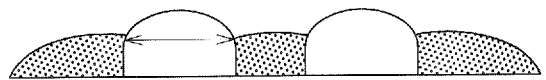
FIG. 5c
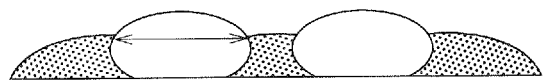
FIG. 5d
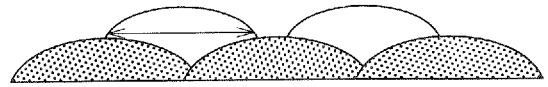

INK JET RECORDING DEVICE AND INK JET RECORDING METHOD

This is a 371 of PCT/JP2009/059124 filed May 18, 2009 which in turn claimed the priority of Japanese Patent Application No. 2008-162987 filed Jun. 23, 2008, both applications are incorporated by reference herein.

TECHNICAL FIELD

The present invention relates to an ink-jet recording device and an ink-jet recording method. More specifically, the present invention relates to an ink-jet recording device of a single pass mode which is provided with a semi-curing light source to irradiate with an active energy ray. The present invention relates to an ink-jet recording device which can carry out multicolor printing using curing reaction with an active energy ray, and it relates to an ink-jet recording method.

BACKGROUND

In recent years, the ink-jet recording method has been applied to various printing fields such as photography, various kinds of printings, and special printings such as marking and color filters because the ink-jet recording method can produce an image simply and at lower cost and more easily compared with a gravure printing method. Particularly, in the field of ink-jet recording method, an image quality almost equal to a silver halide photograph can be obtained by the following means: a recording device which enables to jet and to control a fine dot; an ink having improved properties of color reproduction area, durability, and jetting property; and an exclusive paper in which the absorptivity of the ink, coloring property of the coloring material, and surface glossiness are greatly increased.

Generally there are the following modes in an ink-jet recording device. One of them is a single pass mode which performs image recording by carrying out discharge of the ink on a recording medium from the line head having a plurality of nozzles. The line head is located in substantially orthogonal scanning direction to the conveying direction of the recording medium. The other is a scanning mode which performs image recording by a moving recording head carried in the carriage to a scanning direction, and carrying out discharge of the ink from the nozzles of the recording head during a transfer of the recording head.

Although the scanning method is the way which is used especially widely in a home ink-jet recording device, which makes a picture by allowing a head to go and come back several times, its printing speed is generally very low and as a result its manufacturing efficiency is low. Then, in the field of an industrial field, the single pass mode which is excellent in manufacturing efficiency at high speed has attracted attention recently.

However, although a single pass mode is a mode to print by one scanning (relative displacement of a head with respect to a recording medium) as mentioned above, and it can print at high speed and it is excelled in manufacturing efficiency, the jetted ink from the nozzle may produce unevenness by the effect of conveyance and the accuracy of the nozzle, which will influence the image quality to a large extent.

Moreover, multicolor printing which is more colorful and of high image quality is being required from an expanded market, although the monochrome printing of etiquette, for example, has been produced with a single pass mode printing using one color.

However, when a single pass mode ink-jet recording is employed to perform multicolor printing, after ejection of the ink, the subsequent fixation or solidification of the ejected ink may not be completed, as a result, it was found out that "bleeding" will occur which is produced by mixing inks having different colors. That is, in order to perform multicolor printing with a single pass mode ink-jet recording, it is required to figure out to control the opposite properties to produce an image of high definition. One of the opposite properties is to expand the ink droplet for suppressing the development of an uneven density, and the other is to control the bleeding without extending the ink droplet too much to reduce the uneven density.

As prior art, there is disclosed a technology in Patent document 1. In order to suppress aggregation of the ink which is one cause of generating an uneven density, this technology devised to specify a certain relationship between the resolution of the print produced with a single pass mode printing, the dot size and the diffusion coefficient of a dot at the time of colliding with the receiving layer media which carry out ink absorption so as to avoid aggregation of the inks. However, by using this technology, an uneven density was generated with substantially non-absorbing recording medium, and when this technology was used for multicolor printing, a large amount of bleeding was generated and it was not helpful.

An ink-jet recording device can be classified according to the type of ink as follows. They are: a phase change ink-jet system using a wax ink which is solid at room temperature; a solvent ink-jet system using an ink which is mainly made of a quick-drying organic solvent; and a UV curing ink-jet system using a UV curable ink hardened by irradiation with a UV light.

Among these, a UV curing ink-jet system attracts attention at a point that it is recordable on the recording medium which does not have quick drying and ink absorbency besides an exclusive printing paper, and it begins to be widely used for a single pass mode.

In patent document 2, there is disclosed a line mode ink-jet technology equipped with an active energy ray curable ink and a semi-curing light source which emits an active energy ray by making use of these advantages. According to this technology, it is describes as follow. The surface of the ink droplet which reached the target previously on the recording medium is half-cured with an activity energy ray. Then, this technology tried to reduce the fault of an uneven density by adjusting dot size and the pitch between dots so that the radius of droplets to overlap after making the ink droplet of the same color to reach the target. When a single pass mode of multicolor printing at high speed was combined with this technology, the bleeding between each ink printed in order could not be stopped, and it was a problem. Moreover, with this technology, the uneven density in the overlapping portion was also observed, and this technology did not bear practical use.

On the other hand, there is another technology in patent document 3. In this technique, when ejecting an ink hardened by irradiation with an active energy ray on a recording medium, it was newly added a manufacturing process in an under coat liquid given on the recording medium beforehand, and semi-curing of the ink is performed after this process. However, by this method, since the manufacturing process of newly applying under coat liquid is required, it is inferior to manufacturing efficiency. Moreover, although this under coat liquid and a variety of curable inks are used in an actual field, when affinity with inks was bad, chemical reactions, such as aggregation, were also generated and there was a case where the formula change of the under coat liquid was required, and not all bleeding was controlled well, and actual use including the manufacturing efficiency in the field was not able to be achieved.

PRIOR ART TECHNICAL DOCUMENTS

Patent Documents

Patent document 1: JP-A No. 2004-114688
Patent document 2: JP-A No. 2006-248042
Patent document 3: JP-A No. 2008-23980

SUMMARY OF THE INVENTION

Problems to be Solved by the Invention

An object of the present invention is to provide an ink-jet recording device and an ink-jet recording method which enable to record a high quality image having small deterioration with reduced density unevenness and ink bleeding with each color when applied in multicolor printing with a single pass mode recording at high speed.

Means to Solve the Problems

The above-described object can be resolved by the following embodiments.
1. An ink-jet recording device comprising:
  a conveying section which conveys a recording medium in a conveying direction;
  a head section which is equipped with a plurality of full line type ink-jet heads arranged in the conveying direction of the recording medium, each ink-jet head jetting an active energy ray curable ink having a different color with each other to the recording medium; and
  a semi-curing light source which is located between the ink-jet heads and semi-cures a first ink jetted from the ink-jet head located in an upper stream of the conveying direction of the recording medium and landed on the recording medium before a second ink jetted from the ink-jet head located in a downstream of the conveying direction of the recording medium is landed on the first ink,
  wherein the following conditional expression (1) is satisfied:

$$0.6 \leq R/R0 \leq 0.9, \quad \text{conditional expression (1)}$$

provided that: R is a dot radius of the second ink jetted on the first ink which is jetted on the recording medium and semi-cured; and R0 is a dot radius of the second ink directly jetted on the recording medium.
2. The ink-jet recording device of the aforesaid item 1 comprising:
  a judgment print output device which outputs a judgment print produced by superimposing a dot image of the second ink on an image of the first ink having a plurality of areas which differ in an irradiation energy amount of the active energy ray with each other; and
  an irradiation energy amount setting device which sets up one irradiation energy amount by selecting the one irradiation energy amount between the minimum amount and the maximum amount in a plurality of irradiation energy amounts used for producing the judgment print so that the conditional expression (1) is satisfied, the one irradiation energy amount being referred to at the time of recording.
3. The ink-jet recording device of the aforesaid item 2,
  wherein the judgment print contains a pattern having the plurality of areas located in the conveying direction of the recording medium, and the judgment print output device outputs the judgment print with a single pass by changing the irradiation energy amount while conveying the recording medium.
4. The ink-jet recording device of the aforesaid items 2 or 3,
  wherein the irradiation energy amount setting device reads the judgment print to set up the irradiation energy amount based on data of the dot radius R of the second ink.
5. The ink-jet recording device of any one of the aforesaid items 1 to 4,
  wherein the active energy ray curable ink is a cationic polymerizable UV ray curable ink having a viscosity of 25 mPa·s to 500 mPa·s at 25° C. and having a viscosity of 8 mPa·s to 20 mPa·s at the time of being jetted.
6. The ink-jet recording device of any one of the aforesaid items 1 to 5,
  wherein the irradiation energy amount of the active energy ray is set in the range of 5 mJ/cm$^2$ to 50 mJ/cm$^2$.
7. The ink-jet recording device of any one of the aforesaid items 2 to 6,
  wherein the head section is equipped with three or more full line type ink-jet heads arranged in the conveying direction of the recording medium, each ink-jet head being capable of jetting an active energy ray curable ink having a different color with each other to the recording medium; and
  the judgment print output device outputs the judgment print using the first ink jetted from the ink-jet head located in the upper stream of the conveying direction of the recording medium adjacent to the semi-curing light source, and the second ink jetted from the ink-jet head located in the downstream of the conveying direction of the recording medium adjacent to the semi-curing light source.
8. The ink-jet recording device of any one of the aforesaid items 2 to 7,
  wherein the head section is equipped with three or more full line type ink-jet heads arranged in the conveying direction of the recording medium, each ink-jet head being capable of jetting an active energy ray curable ink having a different color with each other to the recording medium;
  the semi-curing light source is arranged between the ink-jet heads of each color;
  the judgment print output device outputs the judgment print, for each semi-curing light source, using the first ink jetted from the ink-jet head located in the upper stream of the conveying direction of the recording medium adjacent to the each semi-curing light source, and the second ink jetted from the ink-jet head located in the downstream of the conveying direction of the recording medium adjacent to the each semi-curing light source; and
  the irradiation energy amount setting device sets up one irradiation energy amount by selecting the one irradiation energy amount between the minimum amount and the maximum amount in a plurality of irradiation energy amounts used for producing the judgment print for each semi-curing light source so that the conditional expression (1) is satisfied.
9. The ink-jet recording device of any one of the aforesaid items 1 to 8,
  wherein the recording medium is a substantially non ink absorbing medium.
10. A method for forming an ink-jet image comprising the steps of:
  jetting a first ink on a recording medium from a plurality of full line type ink-jet heads each jetting an active energy ray curable ink having a different color with each other;
  irradiating the first ink landed on the recording medium with an active energy ray to semi-cure the first ink; and jetting a second ink to land on the semi-cured first ink to form an image, wherein the following conditional expression (1) is satisfied:

$$0.6 \leq R/R0 \leq 0.9, \quad \text{conditional expression (1)}$$

provided that: R is a dot radius of the second ink jetted on the first ink which is jetted on the recording medium and semi-cured; and R0 is a dot radius of the second ink directly jetted on the recording medium.

11. The method for forming an ink-jet image of the aforesaid item 10, comprising the steps of:

outputting a judgment print which is produced by superimposing a dot image of the second ink on an image of the first ink having a plurality of areas which differ in an irradiation energy amount of the active energy ray with each other;

setting up one irradiation energy amount by selecting the one irradiation energy amount between the minimum amount and the maximum amount in a plurality of irradiation energy amounts used for producing the judgment print so that the conditional expression (1) is satisfied, the one irradiation energy amount being referred to at the time of recording;

producing an image by irradiating with the set one irradiation energy amount.

12. The method for forming an ink-jet image of the aforesaid item 11, wherein the judgment print contains a pattern having the plurality of areas located in the conveying direction of the recording medium, and the judgment print output device outputs the judgment print with a single pass by changing the irradiation energy amount while conveying the recording medium.

13. The method for forming an ink-jet image of the aforesaid items 11 or 12, wherein the one irradiation energy amount setting up step is carried out by reading the judgment print to set up the irradiation energy amount based on data of the dot radius R of the second ink.

14. The method for forming an ink-jet image of any one of the aforesaid items 10 to 13, wherein the active energy ray curable ink is a cationic polymerizable UV ray curable ink having a viscosity of 25 mPa·s to 500 mPa·s at 25° C. and having a viscosity of 8 mPa·s to 20 mPa·s at the time of being jetted.

15. The method for forming an ink-jet image of any one of the aforesaid items 10 to 14, wherein the irradiation energy amount of the active energy curing ray is set in the range of 5 mJ/cm$^2$ to 50 mJ/cm$^2$.

16. The method for forming an ink-jet image of any one of the aforesaid items 11 to 15, wherein the ink-jet image is formed with three or more active energy ray curable inks; and the judgment print is printed out by using the first ink used for image recording immediately before the semi-curing process and the second ink used for image recording immediately after the semi-curing process.

17. The method for forming an ink-jet image of any one of the aforesaid items 11 to 16, wherein the ink-jet image is formed with three or more active energy ray curable inks;

the semi-curing process is carried out during the interval of the image recording of each color;

the judgment print output process is carried out for the each semi-curing process, by using the first ink used for image recording immediately before the semi-curing process and the second ink used for image recording immediately after the semi-curing process to print out the judgment print; and the irradiation energy amount setting step sets up one irradiation energy amount by selecting the one irradiation energy amount between the minimum amount and the maximum amount in a plurality of irradiation energy amounts used for producing the judgment print for the each semi-curing process so that the conditional expression (1) is satisfied.

18. The method for forming an ink-jet image of any one of the aforesaid items 10 to 17, wherein the recording medium is a substantially non-absorbing medium.

Effects of the Invention

According to the present invention, it is possible to provide an ink-jet recording device and an ink-jet recording method which enable to record a high quality image having small deterioration with reduced density unevenness and ink bleeding with each color when applied in multicolor printing with a single pass mode recording at high speed.

BRIEF DESCRIPTION OF THE DRAWINGS

FIGS. 4A to 4C are figures showing an example of a judgment pattern of f R.

FIGS. 5A to 5D are schematic diagrams for illustrating a relationship of a curing degree of an ink and R.

EMBODIMENTS TO CARRY OUT THE INVENTION

Hereafter, the embodiments of the present invention will be described using drawings. In addition, the descriptions of this portion will not limit the technical extent and terminological meanings of the present claims.

Moreover, the affirmative description in the following embodiments of the present inventions shows a best mode, and it does not limit a terminological meaning or technical extent of the present invention.

<Ink-Jet Recording Device>

Hereafter, with reference to accompanying drawings, the ink-jet recording device and the ink-jet recording method relating to the present invention will be described in details.

Figure 1:
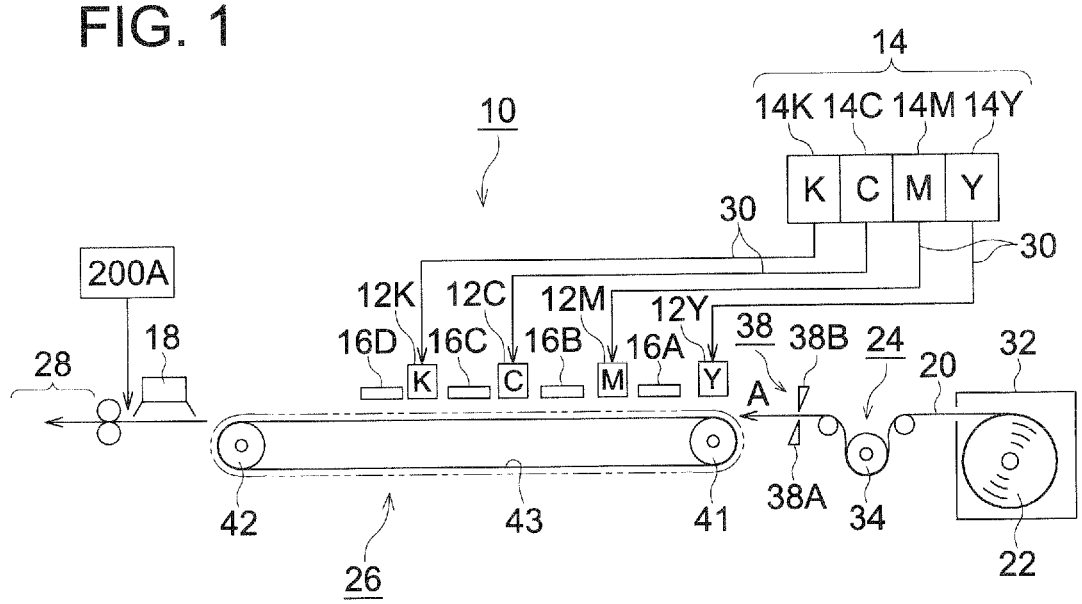
FIG. 1 is an entire configuration figure of an ink-jet recording device relating to the embodiment of the present invention.

FIG. 1 is an entire configuration figure of an ink-jet recording device relating to the embodiment of the present invention. As is shown in the same figure, this ink-jet recording device 10 is provided with the followings: a plurality of ink-jet heads (a head section, hereafter it is called as "heads") 12Y (yellow), 12M (magenta), 12C (cyan) and 12K (black) each are respectively prepared for each ink of Y (yellow), M (magenta), C (cyan) and K (black); an ink storing/loading section 14 which stores a UV curable ink (so called "UV ink") for supplying to each head; semi-curing light sources 16A, 16B, 16C and 16D each are located in the downstream of each head; a complete-curing light source 18 which is located in the downstream of the semi-curing light source 16D positioned at the downstream of the last head (black head 12K); a paper supplying section 22 which supplies a recording medium 20; an anti-curl treating section 24 which removes curling of the recording medium 20; a suction belt conveying section 26 which is located to face to each nozzle surface (ink jetting surface) of the heads 12Y, 12M, 12C, 12K and each light emitting side of the semi-curing light sources 16A, 16B, 16C and 16D, and conveys the recording medium 20 while keeping the flatness of the recording medium 20; and a paper discharge section 28 which discharges the recording medium after being recorded (printed matter) to the outside of the device.

An UV curable ink contains a component which is hardened (polymerized) by irradiation with UV ray energy (a UV curing component, such as a monomer, an oligomer, or a low-molecular-weight homopolymer or copolymer), and a polymerization initiator. It will start polymerization when a UV ray is irradiated, and a viscosity will be increased with progress of polymerization, and it has the nature hardened soon.

The ink storing/loading section 14 is provided with ink tanks 14Y, 14M, 14C and 14K each storing an ink of each color corresponding to each head of 12Y, 12M, 12C and 12K. Each tank is communicated with each head of 12Y, 12M, 12C and 12K through a tube channel 30. Further, the ink storing/loading section 14 is provided with an alarm device (a display device or alarm sound producing device) which indicates when the residual amount of ink is small, and it has a mechanism for preventing the incorrect loading of a different color ink.

In FIG. 1, although a magazine 32 having a roll type recording medium (continuous paper) is shown as an example of a paper supplying section 22, it may be also provided with a plurality of magazines each having a different paper width or a different paper quality. Further, instead of a roll type magazine, or along with this magazine, it may be supplied through a cassette loaded a bundle of cut papers therein.

When a plurality of recording media is made available, it is desirable to perform ink discharge control so that the type of recording medium used may be distinguished automatically and suitable ink discharge may be realized according to the type of recording medium by attaching to a magazine information recording body such as a bar code or a wireless tag which are recorded the type information of a recording medium and by reading the information of the information recording body with a prescribed reader.

The recording medium 20 supplied from the paper supplying section 22 will have a habit of rolling due to the loading in the magazine 32 and it will be curled. In order to remove this curl, in the anti-curl treating section 24, heat is given to the recording medium 20 with a heat drum 34 to a reverse direction of a rolling of the recording medium 20 in the magazine cassette 32. At this time, heating temperature may be controllable so that a printing face becomes curled weakly to the outside.

In the device composition used with a rolled form, as shown in FIG. 1, a paper cutter 38 for cutting is provided and a recording medium is cut into desired size by this paper cutter 38. The paper cutter 38 is composed of a stationary blade 38A which has a length more than the conveyance path width of the recording medium 20, and a round blade 38B which moves along with this stationary blade 38A.

The cut recording medium 20 is sent to the suction belt conveying section 26 after an anti-curl treatment. The suction belt conveying section 26 has a structure where a belt 43 of an endless form is wound between rollers 41 and 42, and it is constituted so that at least a part which counters the nozzle face of each head of 12Y, 12M, 12C, and 12K may be made a plane.

The belt 43 has a width dimension larger than the width of the recording medium 20, and many suction holes (illustration is not shown) are formed in the belt face. The suction holding of the recording medium 20 may be carried out with the belt 43 by preparing a suction chamber inside the belt 43 wound between rollers 41 and 42, the suction chamber being made to negative pressure with a fan.

The belt 43 is driven in the counter clockwise direction in FIG. 1 by transmitting the power of a motor (illustration is not shown) to at least one side of the rollers 41 and 42 around which the drive belt 43 is wound.

The recording medium 20 held on the belt 43 is conveyed from the right on the left along the direction of travel (sub scanning direction A) shown by the arrow head in FIG. 1.

The heads 12Y, 12M, 12C, and 12K each have the width corresponding to the maximum paper width of the recording medium 20 which is handled by the ink-jet recording device 10. The nozzle surface of the head is provided with a plurality of ink discharge nozzles for covering at least one side of the maximum size of the recording medium 20 (the full width of the possible printing region) so as to form a full line type head.

The heads 12Y, 12M, 12C, and 12K are arranged from the upstream along the feed direction of the recording medium 20 in the color order of: yellow (Y), magenta (M), cyan (C), and black (K). The head 12Y, 12M, 12C, and 12K each are arranged to be located almost in the perpendicular direction (primary scanning direction) to the conveying direction of the recording medium 20. If the effect of the present invention is not damaged, by considering the cure sensitivity or the transparency of the ink, the arranged order of the heads may be modified according to requirement.

A color image can be formed on the recording medium 20 by carrying out discharge of each color ink from each head of 12Y, 12M, 12C, and 12K, while conveying the recording medium 20 by the suction belt conveying section 26.

Thus, the single pass mode ink jet recording device 10 has a composition of full line type heads of yellow (Y), magenta (M), cyan (C), and black (B) separately each having nozzle rows to cover the entire width of the paper. Therefore, an image can be recorded all over the recording medium 20 only by carrying out the single pass, in which only one time relative displacement of the recording medium 20 is carried out to the heads 12Y, 12M, 12C, and 12K with respect to the conveying direction of the recording medium 20.

In this example, although the composition by the combination of the standard color inks (four colors) of YMCK was illustrated, the combination of ink colors or a number of inks is not limited to this embodiment, but a number of colors should just be two or more sorts, and it may be added light ink and dark ink if needed. For example, a composition added the ink-jet head which carries out discharge of a light color ink, such as a light cyan or a light magenta, is also possible.

The semi-curing light sources 16A-16D located in the downstream of each head have a width corresponding to the maximum paper width of the recording medium 20 like a head, and they are fixed to be located almost in the perpendicular direction to the conveying direction of the recording medium 20. Compared with the complete-cure light source 18 arranged in the downstream from the head section, an LED element or an LD element having a narrower light emitting wavelength range is suitably used for the semi-curing light sources 16A-16D. However, the center wavelength and the light emitting wavelength range of the semi-curing light sources 16A 16D or the complete-curing light source 18 are chosen according to the design of the ink used.

Each of semi-curing sources 16 is arranged between two adjoining heads 12, respectively. Each of them emit active energy rays enabling to semi-cure the first ink which is ejected to the recording medium from one ink-jet head located in the upper stream before landing the second ink ejected on the first ink from another ink-jet head located in the downstream of the conveying direction of the recording medium.

Before the recording medium 20 passes through a head located in the upper stream head and enters under the subsequent head, a light is irradiated from the semi-curing light sources 16A-16C, and the ink landed on the recording medium 20 is made into a semi-cured state, then jetting by different color head in the next stage is performed.

In an example of FIG. 1, at first, ink ejection is carried out by the yellow head 12Y, then, after the yellow ink is semi-cured by irradiation with the semi-curing light source 16A, ink ejection by the magenta head 12M is carried out. Similarly, after ink ejection by the magenta head 12M, there is performed ink ejection by the cyan head 12C through irradiation with the semi-curing light source 16B, and subsequently, there is performed ink ejection by the black head 12K through irradiation by the semi-curing light source 16C. After the ink ejection by the black head 12K, irradiation is performed with the semi-curing light source 16D. In addition, it is also possible to make a composition which does not have the semi-curing light source 16D.

The ink ejected from the head located in the upper stream along the conveying direction of the recording medium 20 will be semi-cured by irradiation with UV rays, and it becomes possible that the ink on the recording medium 20 maintains a semi-cured state. In the stage in which the recording medium passes through the last semi-curing light source 16D, the ink on the recording medium 20 will be in the semi-cured state by which the progress difference of hardening between colors is small and is equalized.

The complete-curing light source 18 is provided in the after stage of the semi-curing light source 16D. There is used a metal halide lamp or a mercury lamp having a larger light emitting wavelength region and a larger light irradiating amount than the semi-curing light sources 16A-16D. In order to harden the ink thoroughly with the complete-curing light source 18, sufficient light irradiation is performed, and full fixation is performed.

In this way, after passing the complete curing process (process which is carried out hardening fixation to such an extent that image quality deterioration by ink abrasion does not occur during convey handling) by the complete-curing light source 18, the generated printed product is discharged from the paper discharge section 28. In addition, although not shown in FIG. 1, the sorter which accumulates a picture images according to an order is provided in the paper discharge section 28.

Next, the semi-curing light source will be described. The semi-curing light source 16 is located with a plurality semi-curing light source arranged in a line state using a low-pressure mercury lamp with a shielding (not illustrated).

An opening (not illustrated) of a slit shape is formed at the bottom of the shielded semi-curing light source used as a light emitting opening exit. By controlling the amount of luminance of each element, the desired exposure extent and quantity of light (strength) distribution are realizable with respect to the irradiation area of a UV light.

In this case, while controlling appropriately the light-emitting position and the amount of luminance of the semi-curing light source according to the ink ejection extent and ink quantity by the head 12 and the size of the recording medium 20, required light emitting can be performed so as to inhibited as much as possible the deteriorate effects (hardening of the ink in a nozzle etc.) to the head 12.

In addition, it is possible to make a composition which uses a UV light LED and a LD (laser diode), a high pressure mercury lamp, a low pressure mercury lamp, a metal halide lamp, a black fight, a hot cathode tube, and a cold cathode tube for the semi-curing light source.

As factors which influence the image quality at the time of forming a multicolor image using this UV curable ink, the type of recording medium, the type of the first ink previously jetted out on the recording medium, the type of the second ink jetted out on the first ink are cited, for example.

In the ink-jet recording device using the ink hardened by the exposure of active energy rays such as a UV light, image formation is performed using a variety of recording media and inks.

Here, especially in a multicolor superposition image, since characteristics such as the hardening characteristics of the first ink on a recording medium and the superimposed way of the second ink on the first ink will differ depending on the kinds of the ink and the recording medium, there was a case where a desired image was not realized with the development of an uneven density or bleeding when the types of the ink or the recording medium differed and the breadth condition of the dot of the second ink differed.

The irradiation amount of the first ink at the time of semi-curing of the first ink was the amount of irradiation which is received by the first ink at the time of hardening and since this receiving irradiation amount will affect to the state of the ink, the surface of the landed first ink will become a viscosity increasing state or it will be in a hardened state. Since the surface energy of the first ink will be changed with the degree of viscosity increasing and the leveling behavior of the second ink that was ejected on the first ink that has been reached the target will be changed, the dot radius of the second ink will be changed. By increasing an amount of irradiation, the surface energy of the first ink will become high to result in improving surface wettability, and the second ink struck on the first ink previously reached the target will spread easily. Thereby, since the second ink that reached the target on the first ink spreads, its dot radius increases. If it deviates from the optimum condition by such dot radius change, bleeding and an uneven density will occur.

UV curable inks will change their curing sensitivity with types (composition). When an irradiation amount is constant, according to the type of the first ink, the surface energy of the ink which reached the target will change, because the curing sensitivity changes. Therefore, since the leveling behavior of the second ink ejected on the landed ink will be changed by the change of the surface energy, the dot radius of the second ink will be changed. For example, the sensitivity of a UV curable ink becomes high in proportion with the amount of a polymerizable compound contained therein. When an irradiation amount is constant, since the surface energy of the ink is high in proportion with the amount of a polymerizable compound, the surface energy of the first ink landed on the target becomes high and surface wettability will be improved, as a results, the second ink jetted on the first ink that has been reached the target spreads easily. That is, since the ink on the surface spreads, a dot radius of the ink increases.

Next, there will be described in detail about the phenomenon relating semi-curing the first ink and the dot radius (2R) of the second ink by taking an example in which the first color ink is used as the first ink and the second color ink is used as the second ink by referring to FIG. 5.

In FIG. 5, as for the amount of irradiation energy of the semi-curing light source 16, FIG. 5a is the smallest and larger in the order of FIG. 5b, FIG. 5c, and FIG. 5d. As shown in FIG. 5, when the first color ink is ejected on the recording medium, since the recording medium will hardly be permeated, if the grade of semi-curing is changed, infiltration and spreading of the second color ink differs to a great extent from each other, and a dot radius will become large when the amount of irradiation energy is large as is seen in FIG. 5. In FIGS. 5a to 5c, the second ink is permeated to the recording surface of the recording medium. In such state, the contact angle θ determined by the combination of the second color ink and the recording medium will affect the dot radius of the second color ink, and a dot radius becomes larger when the contact angle θ is smaller.

When discharge of the second color ink is carried out while the first ink is not harden enough yet, the second color ink is greatly hidden in the bottom of the first ink, a as a result, the first ink will cover the second color and it becomes an acute angle as shown in FIG. 5a. Therefore, the concentration unevenness is observed due to the sight difference in the thinness there, and since hardening is insufficient, it turned out that practical use was not possible because of easy generation of bleeding with the first color ink and the second color.

On the contrary, when the first color ink is too much harden as shown in FIG. 5d, the second color ink will easily ride on the first color ink, as a result, the ridden portion part will form an acute angle. Therefore, a uneven density occurs too. Moreover, although the above described state will be fixed thought the step of complete curing in such state, the second color ink droplets will be easily mixed with each other to be disturbed when the location of the ink is shifted by conveyance or nozzle accuracy shift. Therefore, it turned out that practical use was not possible too because of easy generation of uneven density by it.

On the other hand, when the semi-cured cases in FIGS. 5b to 5c are investigated, it was found out the followings: when the first ink droplets and the second ink droplets are moderately changed in the length and breadth direction after impact, and when there are few laps in an acute angle surface, a uneven density is not easily observed by human eyes; and further, the color bleeding between different color inks will be controlled by being semi-cured.

That is, it turns out that an uneven density and bleeding are controllable by performing droplet controls of the degree of hiding of the second color ink in the first color ink, and a horizontal dot radius.

As are shown by FIGS. 5b and c, since the contact angle θ, which is determined by the second color ink penetrated to reach the recoding surface of the recording medium, will affect the dot radius of the second color ink, the horizontal breadth can be controlled by a dot radius enlarging. For example, by making the contact angle θ to be smaller, the dot radius is made larger to result in controlling the horizontal breadth. Moreover, since the grade of hiding in the vertical direction is easily affected by the resistance of the viscosity of the first color ink and the second color ink, vertical breadth can be controlled by especially adjusting the grade of the semi-curing state of the first color ink and viscosity.

After extensive investigation, it was found as follows. When the dot radius of the second ink jetted on the first ink previously jetted on the recording medium and semi-cured is R, and the dot radius of the second ink directly jetted on the above-mentioned recording medium is set to R0, it was found that, by adjusting R/R0 so that the following conditional expressions (1) may be satisfied and by considering the balance of the length and breadth of the dots in the superimposed part, the extent which can perform coexistence of a uneven density and bleeding was understood as efficiently solvable.

$$0.6 \leq R/R0 \leq 0.9$$

If R/R0 is smaller than 0.6, it will be easy to come out of a uneven density, and if R/R0 exceeds 0.9, bleeding will occur easily.

In the prior art, usually the superimposing is carried out under the condition of R and R0 being equal. There exists no prior art in which the superimposing is carried out under the predetermined range condition of R being smaller than R0 as is done in the present invention.

In the present invention, when arbitrarily selected two or more color inks among a plurality of color inks are superimposed, with respect to the first ink previously printed and the second ink immediately printed thereafter, R and R0 are set up so as to be satisfied the conditional expression (1).

It is preferable to be satisfied the conditional expression (1) in all combinations about the first color ink directly printed by the recording medium as the first ink and the second color ink immediately printed thereafter as the second ink printed. More preferably, the conditional expression (1) is made to be satisfied about the all combinations of the first ink and the second ink.

For example, in the ink-jet recording device of FIG. 1, the four color heads of Yellow Y, Magenta M, Cyan C, and Black K are arranged one by one from the upper stream toward the downstream of the conveying direction of the recording medium. For this reason, for example, when obtaining a mixed color of a red system, after a yellow ink is jetted out to a recording medium, a magenta ink will be piled up on it.

In the same manner, in obtaining a mixed color of a green system, a cyan ink is piled up on a yellow ink; and in obtaining a mixed color of a blue system, a cyan will be piled up on a magenta ink. There are Y+M, Y+C, Y+K, M+C, M+K, and C+K for combinations of the first ink and the second ink. It is required that just at least one of these combinations of the first ink and the second ink will satisfy the conditional expression (1). Moreover, as for such combinations, for example, in the case of the combination of M+C, although there are combinations of the first color ink and the second color ink, and the second color ink and the third color ink, it is preferable that the conditional expression (1) is satisfied in all combinations of the first color ink and the second color ink. It is further preferable that the conditional expression (1) is satisfied in all combinations of the first ink and the second ink.

Figure 2:
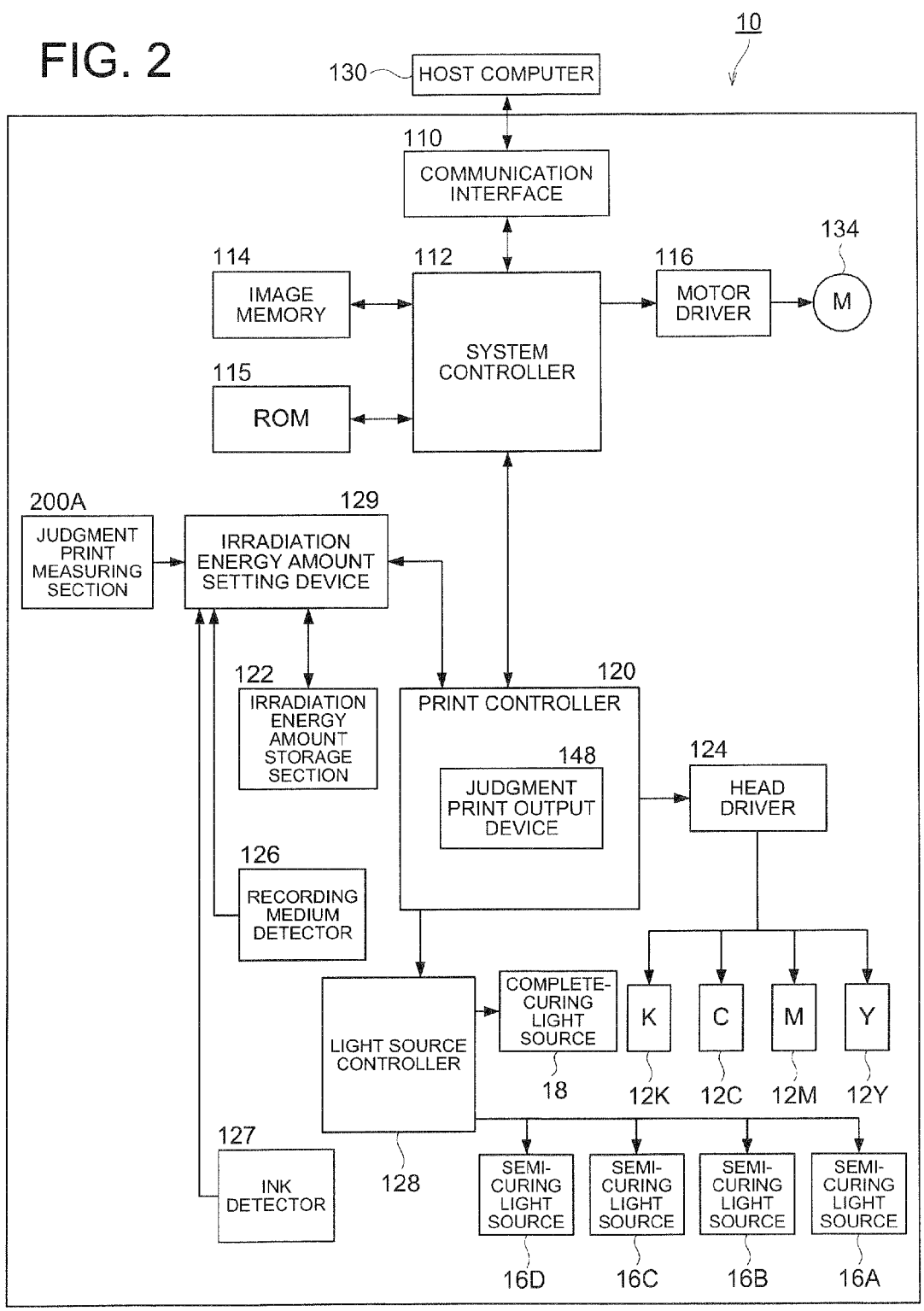
FIG. 2 is a block diagram showing a configuration of a main controller of the ink-jet recording device shown in FIG. 1.

Next, the control system of the ink-jet recording device 10 will be described. FIG. 2 is a composition block diagram of the main section of an ink-jet recording device.

A system controller 112 is composed of CPU (central processing unit) and its peripheral circuits. By executing the program in ROM 115, communication control between a host computers 130, and reading-and-writing control of an image memory 114 are performed, and the control signal which controls a motor 134 to convey the recording medium 20 is generated.

A print controller 120 is a control section which follows control of the system controller 112, and has a signal processing function which processes various processing for generating the signal for setting control and correction from the image data in the image memory 114, and provides the generated setting control signal (dot data) to the head driver 124.

Necessary signal processing is performed in the print controller 120, and control of the amount of ink discharge and discharging timing from the heads 12 having different colors will be performed through the head driver 124 based on this image data.

The head driver 124 drives the actuator (not shown) for discharge driving of each head 12 based on the dot data given from the print controller 120. It may be included the feedback control system for keeping the driving condition of the head constant in the head driver 124.

The data of the image which should be printed are inputted from the outside through the communication interface 110, and are stored in the image memory 114. In this stage, the image data of RGB is memorized by the image memory 114, for example. The image data stored in the image memory 114 is sent to the print controller 120 through the system controller 112, and is changed into the dot data for every ink color by approaches, such as a known dither method and an error diffusion method, in this print controller 120.

In this way, based on the dot data generated by the printer controller 120, drive controlling of each head 12 is carried out, and the ink is jetted out from each head 12.
By controlling the ink discharge from each head 12 synchronized with the transportation speed of the recording medium 20, an image is formed on the recording medium 20.

In this case, it is especially preferable to predict and control the radius at the time of landing by employing a multi droplet method in which ink discharge is possible in several steps of discharge for once time, while controlling the droplet radius at the time of a flight (droplet radius in the state where multi droplets are united). By this way, it can be printed a high definition color image having especially little bleeding and little uneven densities. As a multi droplet method, it is preferable that the amount of a liquid droplet can be adjusted to at least three or more steps.

A recording medium detector 126 as a recording medium recognition part is a means to detect identification information, including the paper kind of the recording medium 20. For example, a means to read information including the bar code given to the magazine 32 of the paper supplying section 22, and a sensor (for example, a sensor which detects a reflectivity) arranged at the suitable location in a paper carrying path are used, and suitable combination of these is also possible. Moreover, instead of these automatic detection means, or in combination with these, it is possible to make a composition which specifies identification information including a paper kind by the input from a prescribed user interface as a recording medium recognition section.

An ink detector 127 as an ink recognition section is a means to detect identification information including the type of ink. For example, a means to read information including the bar code given to an ink tank 14, and a sensor to detect a kind of ink and arranged at the suitable location are used, and suitable combination of these is also possible. Moreover, instead of these automatic detection means, or in combination with these, it is possible to make a composition which specifies identification information including a kind of ink by the input from a prescribed user interface as an ink recognition section.

The information acquired by the recording medium detector 126 and the ink detector 127 is sent to the irradiation energy amount setting device 129. The information is notified to the system controller 112 and/or the print controller 120, and it is used for ink discharge control, control of the semi-curing light sources 16A, 16B, 16C, and 16D.

A light source controller 128 is composed of a semi-curing light source control circuit which controls light on (ON)/light off (OFF), the lighting location, and the amount of luminance of the semi-curing light source 16 at the time of light on; and a complete-curing light source control circuit which controls light on (ON)/light off (OFF), and the amount of luminance of the complete-curing light source 18 at the time of light on.
The light source controller 128 controls luminescence of each light source (16, 18) according to the instruction from the print controller 120. In this case, with respect to the amount of irradiation energy of the semi-curing light source 16, it is preferable to make exposure strength or irradiation time adjustable, and to control them.

That is, the amount of irradiation energy of the semi-curing light source 16 is an amount of energy exposed to the recording medium. The amount of irradiation energy is controlled by changing exposure strength though changing the amount of luminance of the semi-curing light source 16, or by changing the irradiation time of the semi-curing light source 16. Moreover, it is possible to change the transportation speed of the recording medium for changing irradiation time. In the present embodiment, transportation speed is set constant in 200 mm/sec, and the amount change of irradiation energy is carried out by changing the amount of luminance of the semi-curing light source 16. Control is easier rather than changing the transportation speed of the recording medium.

Furthermore, by making the amount of irradiation energy of the complete-curing light source 18 to be optimum based on the information on the characteristics of the recording medium, or on the amount of the loaded ink, it is possible to perform stable fixing treatment and peeling and crack of the ink can be prevented.

As the data stored in an irradiation energy amount storage section 122, with respect to each of the semi-curing light sources 16A, 16B and 16C, there is a table of the optimal amount of irradiation energy which is set up to correspond to every combination of the type of recording medium used for image recording, the type of the first ink, and the type of the second ink.

The table of irradiation energy amount will determine the optimal amount of irradiation energy to semi-cure the first ink jetted out from the heads 12Y-12C located in upstream so that it may correspond to the semi-curing light sources 16A-16C.

It is preferable that the table is set up for every combination of the type of recording medium, the first ink, and the second ink by an experimentation or simulation. For example, in the case of the semi-curing light source 16A which semi-cure the yellow ink, while changing the amount of irradiation energy for every combination of the type of recording medium, the type of yellow ink which is the first ink, and the type of magenta ink which is the second ink, respectively, a multi-color image is recorded. Then, R is measured as a dot radius of the magenta image, R0 is measured as a dot radius from the magenta directly printed on the recording medium, R/R0 is computed, and it is determined that the amount of irradiation energy will satisfy the conditional expression (1). Similarly, in the case of the semi-curing light source 16B which semi-cure the magenta ink, while changing the amount of irradiation energy for every combination of the type of recording medium, the type of magenta ink which is the first ink, and the type of cyan ink which is the second ink, respectively, a multicolor image is recorded. Then, R is measured as a dot radius of the cyan image, R0 is measured as a dot radius from the cyan directly printed on the recording medium, R/R0 is computed, and it is determined that the amount of irradiation energy will satisfy the conditional expression (1).

In the present embodiment, R0 and R of the image were not only automatically measured, but also R/R0 of the dot of the image outputted under each condition was evaluated. And the optimal amount of irradiation energy was set up from the extent which satisfied of the conditional expression (1) based on the evaluation results.

By this, the dot radii R and R0 of a test pattern (hereafter, it may by described as a judgment print) will be measured automatically, and based on the data of R and R0, the amount of irradiation energy of the semi-curing light source 16 will be determined, which will be referred (or used) at the time of recording, so that R/R0 will satisfy the conditional expression (1). As a result, while it becomes possible to record an image having little uneven density and little bleeding, working efficiency will be improved.

Moreover, reliability of the amount setting of irradiation energy can be improved by setting up the amount of irradiation energy based on the read results obtained by reading the judgment print.

R and R0 are the values acquired by the second color ink on the same kind of recording medium and the same kind and the same amount of liquid quantity, and the difference in the first color ink is defined, respectively. an example, in the case of the sequential order of Y ink, M ink, C ink and K ink, in the process of printing the M ink on the Y ink, R0 is a radius of the dot of the M ink which is printed directly to the recording medium, and R is a radius of the dot of the M ink which is printed on the solid printing of the Y ink followed by semi-cured.

R is a value obtained as follows: there is produced an image pattern which is printed beforehand the first ink on the whole surface of the recording medium (so called, a solid printing of 100% printing rate) with the prescribed resolution; then after semi-cured by changing suitably the amount of irradiation energy, the second color ink is printed thereon; then carries out complete curing by giving sufficient energy to cure completely; and the radius of the second ink dot is measured using a judgment print measuring section 200A. It is a value without subjected to pressure to the printed ink.

R0 is a value obtained as follows: there is produced an image which is printed directly the second color ink on the recording medium; then carries out complete curing by giving sufficient energy to cure completely; and the radius of the second ink dot is measured using a judgment print measuring section 200A. It is a value without subjected to pressure to the printed ink. In addition, it may be used the data obtained by the combination of various recording media and the ink beforehand for R0. In this case, the test pattern of R0 is unnecessary.

Complete curing indicates the state where the conversion of the polymerizable compound in the formed image is 70% or more. There is no other requirement. The measurement can be done using a Fourier transform infrared spectrophotometer (FT-IR, for example, IR Prestinge-21 and IRAffinity-1 made by Shimadzu Corporation). Sufficient amount of irradiation energy will be about 150 mJ/cm$^2$ or more. On the contrary, semi-curing is the state where the required conversion is 50% or less. Moreover, the state where the formed color image area is completely cured indicates the state of hardening to such an extent that image quality deterioration by ink abrasion does not occur during convey handling after hardening with a complete-curing light source.

In the present embodiment, a photograph is taken using a high speed video camera as a judgment print measuring section 200A, and measurement data are obtained from the taken picture image. In addition, it may be measured by a help using well-known microscope observation and the loupe of high magnification by the aid of human. Furthermore, an image may be automatically captured with the scanner available in the market from a judgment print, and measurement data may be obtained from the taken image.

The amount of ink droplet of the second color ink is preferably 4 pl to 40 pl, and it is more preferably 6 pl to 20 pl. The contact angle with the recording medium is preferably 10° to 30°. From the viewpoints of balance of production efficiency and bleeding quality, the resolution is preferably 150 dpi to 1,200 dpi per one color, and it is more is preferably 300 dpi to 800 dpi.

R can be controlled by adjusting the balance of the viscosity, the density, and the surface tension of the first color ink and the second color ink. However, as a factor which can be precisely controlled and greatly affects, it can be cited the hardening degree and the increase of the viscosity by the irradiation energy exposed to the piled first color ink immediately before landing the second color ink.

When the resolution of the second color image in the direction which intersects almost perpendicularly to the conveying direction of the recording-medium is set to X (dpi: dots/inch, dot number per inch), R0 (mm)$\leq$1.4 (25.4/X) is desirable. It is further preferably 0.8 (25.4/X) to 1.2 (25.4/X). When it is too small, there is a tendency of easily generating an uneven density. When it exceeds 1.4, bleeding will occur easily.

Moreover, as a system, the type of recording medium is various, and characteristics may differ in the recording medium, respectively. Moreover, in the case where Y, M, C, and K ink are printed, the balance by combination with various viscosity, densities, surface tension, etc. can be considered.

On the other hand, when it is taken in consideration that the viscosity range of the ink which can be discharged from the nozzle of an ink-jet head is restricted, the following is realistic and most important: to adjust the physical properties of the ink to some extent; then, as for the rest, to adjust suitably the degree of semi-curing the first color ink by taking advantage of the merit of using a curable ink to the maximum extent.

In order to adjust R/R0 so that the conditional expression (1) may be satisfied, it can be adjusted by changing the quantity, type, and ingredient ratio of a hardening reaction component in the ink. It can be attained by adjusting the amount of irradiation energy of the semi-curing light source with the above-mentioned way.

The amount of irradiation energy can be determined by changing the amount of irradiation energy exposed to the first color ink so that a conditional expression (1) may be satisfied. It is preferable that the amount of irradiation energy is 5 mJ/cm$^2$ to 50 mJ/cm$^2$ from the viewpoint of preventing both bleeding and uneven density at the same time.

Moreover, the number of times which passes through the semi-curing light source 16 increases as the ink jetted out from the heads 12 which exist in the upstream along the conveying direction of the recording medium 20. For example, as a combination of the first color+the second color+the third color printed on a recording medium: in Y+M, M+C, and C+K, the number of times is one time; in Y+C and M+K, the number of times is two times; and in Y+K, the number of times is three times.

Thus, it is preferable to adjust the amount of irradiation energy so that a desired semi-cured state may be maintained even if exposure of two or more times is received with the semi-curing light source 16, and the conditional expression (1) may be fulfilled.

Next, a judgment print will be described. As for R, it is preferable to use the data of the dot radius R of the second color obtained by measuring the judgment printed which is prepared by printing the second color ink on the image pattern produced by changing the amount of irradiation energy of the semi-cured light source in two or more steps after performing solid printing with the first color ink.

The recording medium used for obtaining R is a recording medium which is going to be printed. When R is measured from a judgment print, it is most preferable to automatically measure, after that, to compute and control the optimal amount of irradiation energy so R/R0 may satisfy the conditional expression (1).

Measurement of a judgment print is performed by the judgment print measuring section 200A as mentioned above.

Figure 3:
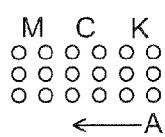
FIG. 3 is a figure showing an example of a judgment pattern of f R0.

An example of a judgment pattern R0 is shown in FIG. 3, and an example of a judgment pattern R is shown in FIGS. 4a to 4c. As shown in FIG. 3, a judgment pattern R0 is a pattern which was produced by complete curing with sufficient amount of curing energy was given, after carrying out discharge of the ink, such as M, C, and K, directly as a second color ink on a recording medium, respectively. As an amount of curing energy, generally, an amount of 150 mJ/cm$^2$ will be enough.

R judgment pattern shown in FIG. 4c was produce by carrying out solid printing with Y ink in four portions, then the solid print was irradiated with the semi-curing light source 16A by changing the amount of luminance to change the irradiation energy with 5, 10, and 50, 100 mJ/cm$^2$, respectively. Then, M, C, and K inks were printed with a half resolution so that the dot radius may be clearly distinguished, and afterwards, complete curing was performed with the complete-curing light source 18. Similarly, FIG. 4b shows a pattern produced by printing Y, C and K inks printed on M ink, and further, FIG. 4a shows a pattern produced by printing Y, M and K inks on C ink.

Thus, a judgment print is a superimposed image which is formed with the dot image of the above-mentioned second ink on the first ink image having several portions where the amount of irradiation energy of an activity energy ray differ respectively. By making a pattern arranged to have several portions in the conveying direction, it is possible to output the aforesaid judgment print with one pass by allowing the judgment print output device to change the above-mentioned amount of irradiation energy while conveying the recording medium. As a result, the judgment print which is changed the amount of irradiation energy can be outputted easily.

In the present invention, there can be applied other various patterns and the combination of other amounts of irradiation energy, and it is not limited to three colors. What is most important is to make a print in the predetermined order as follows: at first to make a solid print with the first color, then to print a pattern with the second color so that each dot will not be overlapped with each other and will have an interval which enables to measure R at this time. In the present embodiment, a judgment print is produced using each pair of adjacent heads (12Y and 12M, 12M and 12C, and 12C and 12K). Namely, one pattern is to form Y solid print followed by semi-curing with the semi-curing light source 16A followed by printing M dots image, then carried out complete curing; another pattern is to form M solid print followed by semi-curing with the semi-curing light source 16B followed by printing C dots image, then carried out complete curing; and further another pattern is to form C solid print followed by semi-curing with the semi-curing light source 16C followed by printing K dots image.

The judgment print having the above three types of patterns is prepared, and each amount of irradiation energy of the semi-curing light sources 16A, 16B, and 16C is setup.

Thus, the judgment print is produced by the judgment print output device using the first ink jetted from the ink-jet head located in the upper stream of the conveying direction and adjacent to the semi-curing light source 16, and the second ink jetted from the ink-jet head located in the downstream of the conveying direction and adjacent to the semi-curing light source 16, thereby setting of the amount of irradiation energy becomes easy.

Especially when the semi-curing light source is arranged between the above-mentioned ink-jet heads of each color, respectively, the judgment print output device outputs a judgment print for each semi-curing light source using the first ink jetted from the ink-jet head located in the upper stream of the conveying direction and adjacent to the semi-curing light source, and the second ink jetted from the ink-jet head located in the downstream of the conveying direction and adjacent to the semi-curing light source, and the irradiation energy amount setting device selects and sets up the one amount of irradiation energy referred to at the time of recording so that the above-mentioned conditional expression (1) may be satisfied between the minimum and the maximum of the plural kinds of amounts of irradiation energy used for the above-mentioned judgment print for every semi-curing light source.

A judgment print output device 148 generates data of a judgment pattern as shown in FIG. 3 and FIG. 4.

Or it derives data from a prescribed memory, the data of judgment pattern is sent to each heads 12Y, 12C, 12M, and 12K through the head driver 124, and it outputs as a judgment print.

The density measurement of the outputted judgment print in FIG. 3 or FIG. 4 is carried out by the judgment print measuring section 200A as mentioned above. The measurement results are sent to the irradiation energy amount setting device 129 by making R0 and R to correspond to the amount of irradiation energy.

And the irradiation energy amount setting device 129 sets up the amount of irradiation energy of the semi-curing light source 16 so that R/R0 may become an optimum value within limits which satisfy the conditional expression (1) based on R/R0. While making the irradiation energy amount storage section 122 to memorize the optimum amount of irradiation energy by making to correspond the combination of identification information on the recording medium, the identification information on the first color ink, and the identification information on the second ink, and the irradiation energy amount setting device 129 sends the data to the print controller 120. The print controller 120 sends indication to the light source controller 128 based on the set value of the sent amount of irradiation energy and controls the amount of the radiation light of the corresponding semi-curing light source 16 so that it will emit light of the set value.

Thus, the irradiation energy amount storage section 122 can set the optimum amount of irradiation energy for each ink and can memorize this amount of irradiation energy by matching the identification information on the recording medium 20 and the identification information on the ink that were sent from the recording medium detector 126 and the ink detector 127.

If the target value of R/R0 is set up in the extent with which satisfy the conditional expression (1), when the amount of irradiation energy to semi-cure the first color ink is set constant, basically, R becomes larger when the contact angle θ between the recording medium and the second color ink becomes smaller. Since there is a tendency that R becomes larger when the cure sensitivity of the first color ink is higher, it is memorized a table which sets up the amount of irradiation energy to be relatively small in the combination of such recording medium and ink.

Next, an action of the ink-jet recording device 10 of the present embodiment will be described with reference to the flow chart of FIG. 6.

Figure 6:
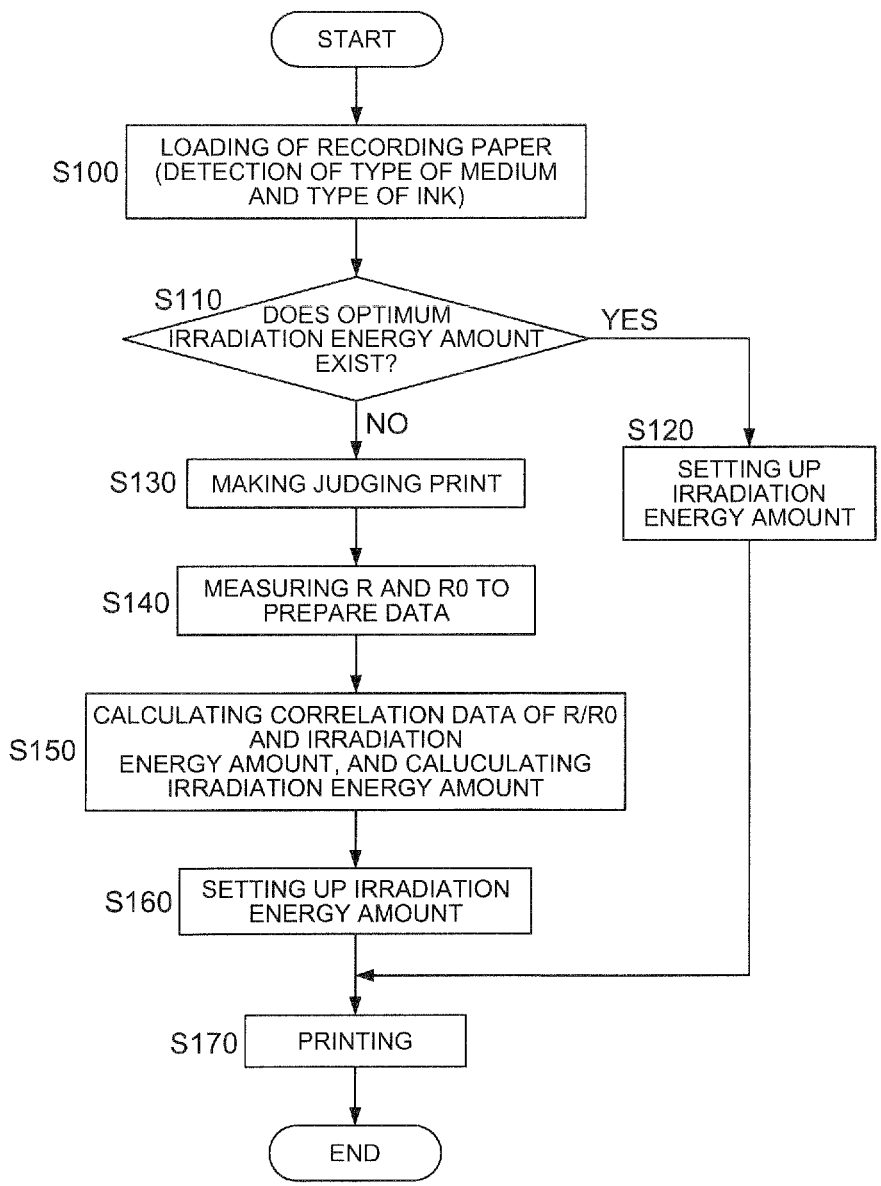
FIG. 6 is a flow chart which shows an example of a job of an ink-jet recording device.

First, in the step S100 of FIG. 6, the ink-jet recording device 10 is loaded with the paper supplying section 22 for providing the recording medium 20. As mentioned above, in the paper supplying section 22, identification information, including the type of recording medium 20 with which it is loaded is read. Other initial information which is read in the recording medium detector 126 is sent to the irradiation energy amount setting device 129. On the other hand, identification information, including the type of ink is detected by the ink detector 127, and the identification information on the detected ink type is similarly sent to the irradiation energy amount setting device 129.

In the subsequent step S110, the irradiation energy amount setting device 129 judges whether the optimum irradiation energy amount corresponding to identification information, including the sent media type information, is already setup, and is memorized by the irradiation energy amount storage section 122 or not. When an optimum irradiation energy corresponding to identification information such as media type information exists, it is progressed to a step S120. The optimum irradiation energy amount stored in the irradiation energy amount storage section 122 is called and it is sent to a print controller 120. The print controller 120 sets up each of the semi-curing light sources 16A, 16B, and 16C through the light source controller 128 so that an amount of the radiation light will correspond to the optimum irradiation energy amount.

On the other hand, when an optimum irradiation energy corresponding to identification information such as media type information does not exist, it proceeds to a step S130 to make a judgment pattern by which is set up an optimum irradiation energy amount.

In the step S130, the print controller 120 reads judgment print data from the judgment print output device 148, and performs image recording of R judgment print by changing the amount of the radiation light of the semi-curing light source 16 in a plurality of steps using each pair of adjacent heads (12Y and 12M, 12M and 12C, and 12C and 12K). Moreover, it reads judgment print data of R0 as is shown in FIG. 2 and performs image recording of R0 judgment print by allowing to ejecting a second color ink from each head of 12M, 12C, and 12K.

Next, in a step S140, the irradiation energy amount setting device 129 controls the judgment print measuring section 200A and measures the dot radii R and Ro of the second color ink by taking a picture from the top of the image with a high speed video camera in the judgment print measuring section 200A and by processing the taken picture. The measurement results are sent to the irradiation energy amount setting device 129 by matching R0, R, and the amount of irradiation energy for every color of ink.

Figure 7:
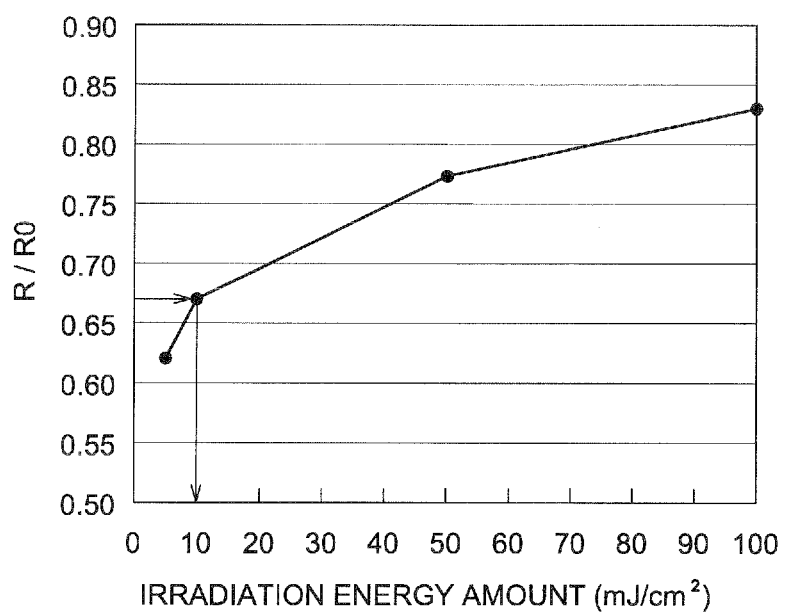
FIG. 7 is a correlation diagram of an amount of irradiation energy with R/R0.

Next, in a step S140, the irradiation energy amount setting device 129 sets up the target value of R/R0 from the range of R/R0 which satisfies the conditional expression (1) while building the correlation data of R/R0 and the irradiation energy amount as shown in FIG. 7 to each of the semi-curing sources 16A and 16B and 16C. For example, when R/R0 is aimed at 0.67, the required irradiation energy amount is calculated as 10 (mJ/cm$^2$). The measured correlation data are integrated if needed and accuracy can be raised.

Moreover, it is preferable to prepare the correlation data of FIG. 7 between each color ink from the viewpoint of getting all of the irradiation energy of the semi-curing light sources 16A-16C. It also becomes easy to control to fulfill the conditional expression (1), when a plurality of irradiation is performed as mentioned above. Further, it is preferable to set up a setting of the irradiation energy amount within the limits of 0.6-0.7 which are the lower limits of R/R0 for the same reason. For example, by setting the irradiation energy amount as 10 (mJ/cm$^2$) corresponding to 0.67 in FIG. 7, even if three times of irradiation energy amount is received by three time exposure, the conditional expression (1) can be satisfied without exceeding 0.9 which is an upper limit of R/R0.

Next, in a step S160, these optimum irradiation energy amounts are sent to the print controller 120. The print controller 120 calculates the amount of the radiation light of the semi-curing light source 16 corresponding to the set value of the sent irradiation energy amount, and sets each of the semi-curing light source 16A, 16B, and 16C through the light source controller 128.

Next, in a step S170, image recording (printing) is performed by making use of these optimum irradiation energy amounts. Moreover, in the step S110, when these optimum irradiation energy amounts are set up at the step S120 in the case of the optimum irradiation energy amount exists, printing is performed at the step S170. However, when the condition is deviated to a large extent or there is provided with a branch of conditions to get an N number, it can also print again the judgment print of S130 after setting this optimum irradiation energy amount in S160.

As mentioned above, according to the ink-jet recording device of the present embodiment, it is possible record a high quality image having small deterioration with reduced density unevenness and ink bleeding with each color when applied in multicolor printing with a single pass mode recording at high speed by making satisfying the above-mentioned conditional expression (1). In this expression, the dot radius of the second ink jetted out on the first ink jetted out and semi-cured on the recording medium is set to R, and the dot radius of the second ink jetted out directly on the above-mentioned recording medium is set to R0.

In addition, the ink-jet recording device of the present embodiment is provided with: a judgment print output device outputting a superimposed image which is formed with the dot image of the second ink on the first ink image having several portions where the amount of irradiation energy of an activity energy ray for semi-curing differ respectively, and an irradiation energy amount setting device which selects and sets up one amount of irradiation energy referred to at the time of recording so that the conditional expression (1) may be satisfied between the minimum and the maximum of the plural kinds of amounts of irradiation energy used for the judgment print. The above-mentioned amount setting device of irradiation energy sets up the amount of irradiation energy of the above-mentioned semi-curing light source at the time of image recording with efficient and easy processing based on a judgment print so that the required irradiation energy may be emitted which satisfy the conditional expression (1). The second ink piles up on the first ink which has been semi-cured with the determined amount of irradiation energy to produce a required image and a multicolor image can be recorded. Thereby, even if the types of recording medium or ink differ, the difference in spread of the second ink by the type of recording medium or ink is controlled, and the a multicolor image having little uneven density or little bleeding can be recorded.

<<Plurality of Activity Energy Ray Curable Inks>>

Next, the activity energy ray curable ink relating to the present invention will be described.

It is preferable that the plurality of activity energy ray curable inks (hereafter, they may be called simply as "ink")

relating to the present invention composes an ink set composed of two or more inks each having a different color, and at least one of the photopolymerization initiator composition contained in one ink differs from the photopolymerization initiator composition of other inks.

As inks composing an ink set of the present invention, it is preferable that they are at least two inks selected from the group consisting of a yellow ink, a magenta ink and a cyan ink. It is more preferable that that the ink set contains four sorts: a yellow ink, a magenta ink, a cyan ink, and a black ink. Moreover, according to necessity, the ink set of the present invention may have a composition of having added a light color ink (for example, a light magenta ink, a light cyan ink, and a light black ink) and a white ink using a white pigment.

Each activity energy ray curable ink relating to with the present invention is mainly composed of an active energy ray polymerizable compound (hereafter, it may be called only as a polymerizable compound), composition compounds of a photopolymerization initiator group, and a coloring material. The composition of the photopolymerization initiator group according to the present invention indicates a single photopolymerization initiator, a plurality of photopolymerization initiators, a combination of a photopolymerization initiator and a sensitizer, and a combination of a photopolymerization initiator, a sensitizer and an initiator aid. It is preferable that the composition of these photopolymerization initiator groups differs among at least two sorts of ink.

[Activity Energy Ray Polymerizable Compound]

As an activity energy ray polymerizable compound which is applicable to an activity energy ray curable ink of the present invention, there can be cited a radical polymerizable compound and a cation polymerizable compound. In particular, a UV curable ink of a cationic polymerization system has the wide extent of the amount of irradiation energy of the activity energy ray to become as a semi-cured state compared with a UV curable type ink of a radical polymerization system, and since a setting of the amount of irradiation energy becomes easy, it is desirable.

(Radical Polymerizable Compound)

A radical polymerizable compound applicable to the present invention is a compound having an ethylenically unsaturated bond which is radical polymerizable. As long as it is a compound having in the molecule at least one ethylenically unsaturated bond which is radical polymerizable, any kind of compounds may be used. Chemical structures such as a monomer, an oligomer, and a polymer, are contained. A radical polymerizable compound may be used solely, or two or more sorts thereof may be used together with an arbitrary coxing ratio, in order to improve the target characteristics. Moreover, a multifunctional compound with two or more functional groups is more preferable than a monofunctional compound. It is further preferable to use together two or more sorts of multifunctional compounds from the viewpoints of controlling properties such as reactivity and physical properties.

As examples of a compound having an ethylenically unsaturated bond which is radical polymerizable, there can be cited radical polymerizable compounds of: acrylic acid, methacrylic acid, itaconic acid, crotonic acid, isocrotonic acid, unsaturated carboxylic acid such as maleic acid and a salt thereof; ester, urethane, amide, anhydride, acrylonitrile, styrene, various unsaturated polyester, unsaturated polyether, unsaturated polyamide and unsaturated urethane. Specific example compounds are: acrylic acid derivatives such as acryloyl morpholine, phenoxyethyl acrylate, 2-hydroxy-3-phenoxypropyl acrylate, 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acrylaoxypolyethoxyphenyl) propane, EO modified bisphenol A diacrylate, polyethylene glycols diacrylate, pentaerythritol triacrylate, pentaerythritol tetraacrylate, glycerol epoxy acrylate, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxy acrylate; methacrylate derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, 2,2-bis(4-methacryloxy polyethoxyphenyl) propane; and further, allyl compound derivatives such as allyl glycidyl ether, diallyl phthalate and triallyl trimeritate. More specifically, there can be cited commercially available compounds or publicly known radical polymerizable or cross-linkable monomers, oligomers or polymers described in: "Cross-linking agents", edited by Shinzo YAMASHITA (1981, Taiseisha); "UV•EB curing handbook (Raw material section)", edited by Kiyomi KATO (1985, Polymer Publishing Society); "Application and market of UV•EB curing technology", page 79, edited by Radotech Society (1989, CMC Publishing, Co.); and "Handbook of Polyester Resin", by E-ichi TAKIYAMA (1988, Nikkan Kogyo Newspaper). The addition amount of the above-mentioned radical polymerizable compound is preferably 1 to 97 weight %, and it is more preferably 30 to 95 weight %.

(Cation Polymerizable Compound)

As a cation polymerizable compound applicable to the present invention, there can be cited compound such as an epoxy compound, an oxetane compound, a vinyl ether compound, which can be polymerized by cationic polymerization, for example.

As an epoxy compound which can be used in the present invention, it can be used any well-known epoxy compounds described in the publications of: JP-A No. 2001-220526, JP-A No. 2002-188025, JP-A No. 2002-317139, JP-A No. 2003-55449 and JP-A No. 2003-73481, for example. It is preferable to use cyclohexene oxide or cyclopentene oxide inclusion compound obtained by carrying out epoxidation to the compound having at least one cycloalkane ring such as a cyclohexene or a cyclopentene ring, with suitable an oxidizing agent such as hydrogen peroxide or peracid.

As an oxetane compound which can be used in the present invention, it can be used any well-known oxetane compounds described in the publications of JP-A No. 2001-220526 and No. 2001-310937, for example.

Examples of a vinyl ether compound which can be used in the present invention include: a di or trivinyl ether compound such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, trimethylolpropane trivinyl ether; and a monovinyl ether compound such as ethyl vinyl ether, n-butyl vinyl ether, isobutyl vinyl ether, octadecyl vinyl ether, cyclohexylvinyl ether, hydroxybutyl vinyl ether, 2-ethylhexyl vinyl ether, cyclohexanedimethanol monovinyl ether, n-propyl vinyl ether, isopropyl vinyl ether, isopropenyl ether o-propylene carbonate, dodecyl vinyl ether, diethylene glycol monovinyl ether, octadecyl vinyl ether.

Although one sort of the above-mentioned polymerizable compound may be used independently, it may be used suitably combined two or more sorts of compounds.

Moreover, it is also possible to use a hybrid curable ink of a radical-cation as a means to prevent the sensitivity decrease by the shielding effects of a coloring material in an ink by making a combination of a cation polymerizable monomer with a long initiator life span and an initiator.

[Composition of a Photopolymerization Initiator Group]

As an additive which constitutes the photopolymerization initiator group of the present invention, a radical polymerization initiator, a cationic initiator, an initiator aid, a sensitizer are included. An added amount of these photopolymerization initiator groups in the ink is required to be 1 to 10 weight parts of the whole ink.

Although it can be used well-known various compounds as a photopolymerization initiator group relating to the present invention, it is chosen from the compounds which are dissolved in the above-mentioned polymerizable compounds.

(Photopolymerization Initiator)
<Radical Polymerization Initiator>

The following compounds can be used as a radical polymerization initiator: triazine derivatives disclosed in each official gazette of JP-B No. 59-1281, JP-B No. 61-9621, and JP-A No. 60-60104; organic peroxides disclosed in each official gazette of JP-A No. 59-1504 and No. 61-243807; diazonium compounds disclosed in each official gazette of JP-B No. 43-23684, JP-B No. 44-6413, JP-B No. 44-6413, JP-B No. 47-1604, and U.S. Pat. No. 3,567,453; organic azide compounds disclosed in the specification of U.S. Pat. No. 2,848,328, U.S. Pat. No. 2,852,379, and U.S. Pat. No. 2,940,853; orthoquinone diazides disclosed in each official gazette of JP-B No. 36-22062, JP-B No. 37-13109, JP-B No. 38-18015, and JP-B No. 45-9610; various onium compounds disclosed in each official gazette of JP-B No. 55-39162 and JP-A No. 59-14023, and in "Macromolecules", the 10th volume, page 1307 (1977); azo compounds disclosed in JP-A No. 59-142205; metal allene complexes disclosed in each official gazette of JP-A No. 1-54440, European Patent No. 109,851, and European Patent No. 126,712, "Journal of Imaging Science" (J. Imag. Sci.), the 30th volume, page 174 (1986); sulfonium (oxo) organic boron complexes disclosed in each official gazette of JP-A No. 4-213861 and JP-A No. 4-255347; titanocene compounds disclosed in official gazette of JP-A No. 61-151197; transition metal complexes which contain a transition metal such as ruthenium disclosed in "Coordination Chemistry Review" the 84th volume, pages 85-277 (1988) and JP-A No. 2-182701; 2,4,5-triaryl imidazole dimer and carbon tetrabromide disclosed in JP-A No. 3-209477; and organic halogenated compounds disclosed in JP-A No. 59-107344. It is preferable that these polymerization initiators are contained in an amount of 0.01 to 10 weight parts to 100 weight parts of the compounds which have an ethylenically unsaturated bond and which are radical polymerizable.

<Cationic Polymerization Initiator>

In the active energy ray curable ink relating to the present invention, it is preferable to contain a cationic polymerization initiator as a photopolymerization initiator with a cation polymerizable compound.

A specific example of a cationic polymerization initiator is a photo-acid generating agent. For example, the compounds used for chemical amplification type photo-resists or photo-cationic polymerization is used (see "Organic Materials for Imaging", pages 187 to 192, edited by Society of Organic Electronic Materials, Bunshin Publishing Co., (1993). Examples of suitable compounds for the present invention are given below.

At first, there can be cited: $B(C_6F_5)_4^-$, $PF_6^-$, $AsF_6^-$, $SbF_6^-$, and $CF_3SO_3^-$ salts of an aromatic onium compound such as diazonium, ammonium, iodonium, sulfonium, and phosphonium.

Specific examples of an onium compound which can be used in the present invention are shown below.

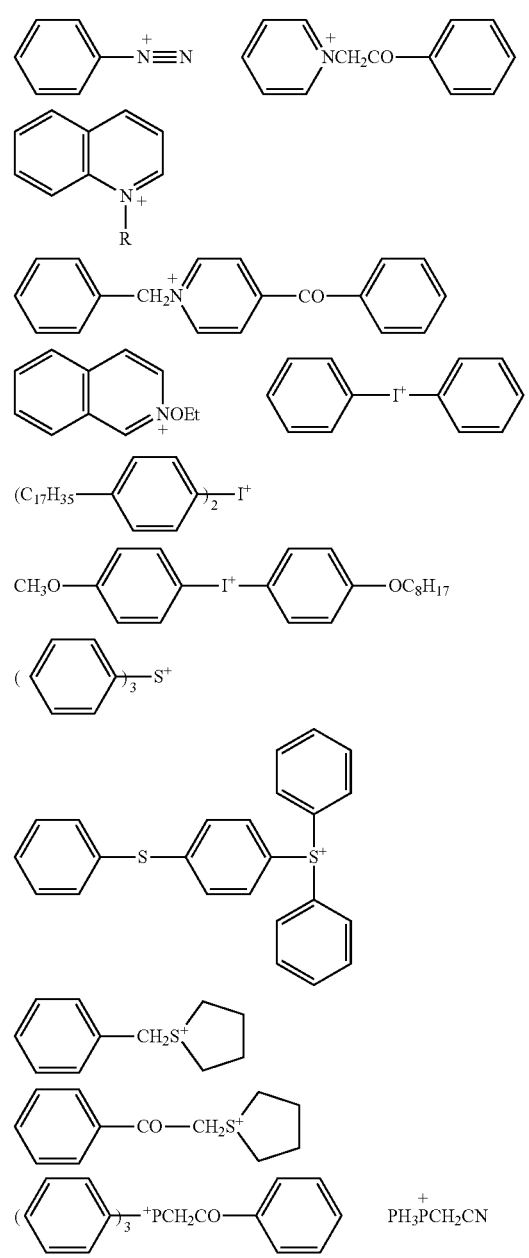

Secondly, sulfonation compounds which generate sulfonic acid can be cited and specific examples thereof are illustrated below.

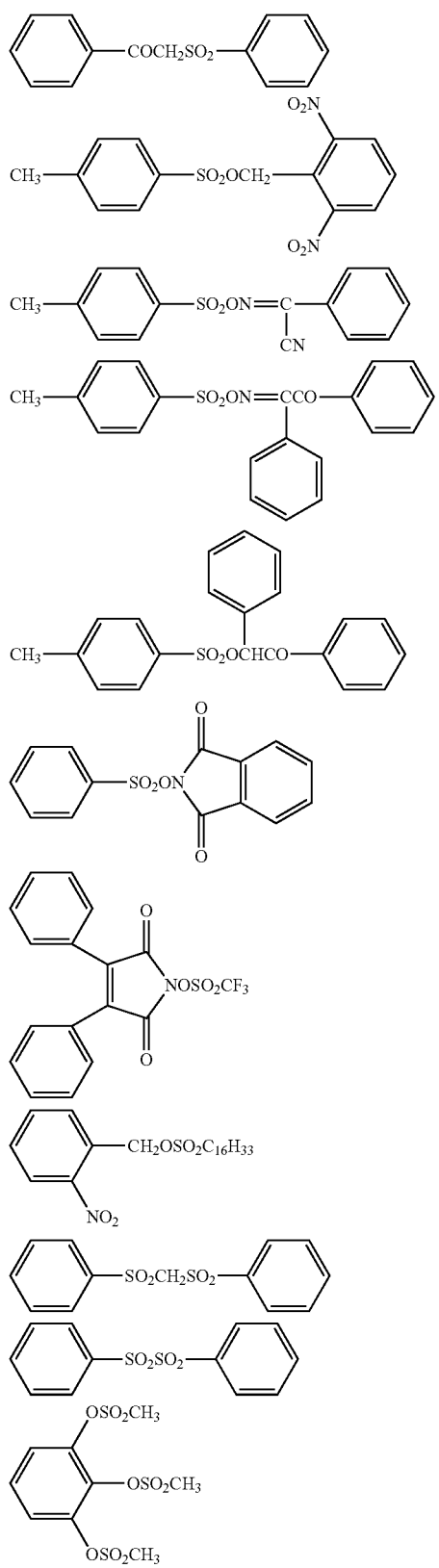

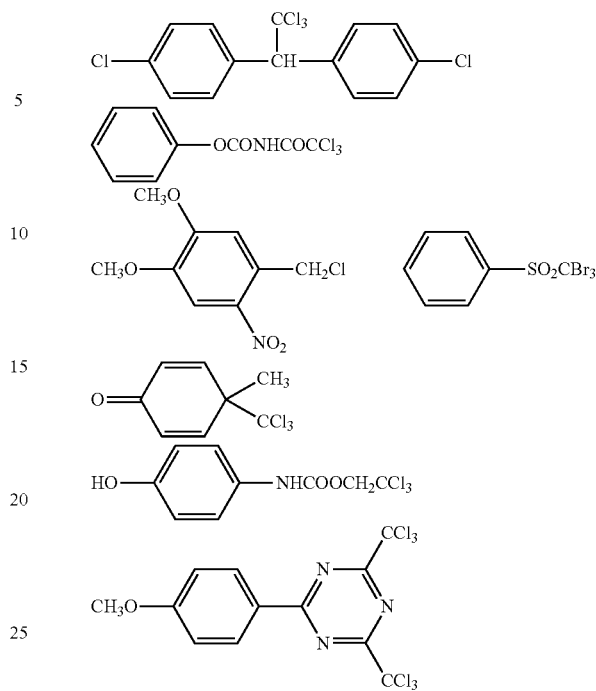

Thirdly, halides which generates hydrogen halide with light can also be used, and specific examples thereof are illustrated below.

Fourthly, an iron allene complex can be cited.

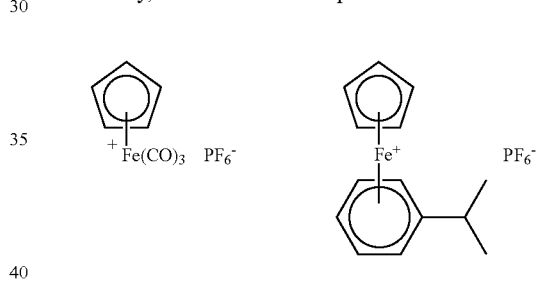

(Sensitizer)

In the active energy ray curable ink relating to the present invention, it is preferable use a sensitizer which has ultraviolet-spectrum absorption in longer wavelength than 300 nm. For example, there can be cited the following compounds: a polycyclic aromatic compound which has at least a hydroxyl group, an aralkyloxy group or an alkoxy group both of which may be substituted as a substituent; a carbazole derivative; and a thioxanthone derivative.

Preferable examples of a polycyclic aromatic compound which can be used in the present invention are: a naphthalene derivative, an anthracene derivative, a chrysene derivative and a phenanthrene derivative. As an alkoxy group which is a substituent, a group having a carbon atom number of 1 to 18 is preferable, and a group having a carbon atom number of 1 to 8 is especially preferable. As an aralkyloxy group, a group having a carbon atom number of 7 to 10 is preferable, and a benzyloxy group of a carbon atom number of 7 to 8 and a phenethyloxy group are especially preferable.

Examples of these sensitizers which can be used in the present invention are: carbazole derivatives such as carbazole, N-ethylcarbazole, N-vinylcarbazole and N-phenylcarbazole; naphthalene derivatives such as 1-naphthol, 2-naphthol, 1-methoxynaphthalene, 1-stearyloxynaphthalene, 2-methoxynaphthalene, 2-dodecyloxynaphthalene, 4-methoxy-1-naphthol, glycidyl-1-naphthyl ether, 2-(2-naphthoxy)

ethyl vinyl ether, 1,4-dihydroxynaphthalene, 1,5-dihydroxynaphthalene, 1,6-dihydroxynaphthalene, 2,7-dihydroxynaphthalene, 2,7-dimethoxynaphthalene, an 1,1'-thiobis(2-naphthol), 1,1'-bi-2-naphthol, 1,5-naphthyl diglycidyl ether, 2,7-di(2-vinyloxyethyl)naphthyl ether, 4-methoxy-1-naphthol, ESN-175 and its series (an epoxy resin made by Nippon Steel Chemical Co., Ltd.) and a condensation product of a naphthol derivative and formalin; anthracene derivatives such as 9,10-dimethoxyanthracene, 2-ethyl-9,10-dimethoxyanthracene, 2-t-butyl-9,10-dimethoxyanthracene, 2,3-dimethyl-9,10-dimethoxyanthracene, 9-methoxy-10-methylanthracene, 9,10-diethoxanthracene, 2-ethyl-9,10-diethoxanthracene, 2-t-butyl-9,10-diethoxanthracene, 2,3-dimethyl-9,10-diethoxanthracene, 9-ethoxy-10-methylanthracene, 9,10-dipropoxyanthracene, 2-ethyl-9,10-dipropoxyanthracene, 2-t-butyl-9,10-dipropoxyanthracene, 2,3-dimethyl-9,10-dipropoxyanthracene, 9-isopropoxy-10-methylanthracene, 9,10-dibenzyloxyanthracene, 2-ethyl-9,10-dibenzyloxyanthracene, 2-t-butyl-9,10-dibenzyloxyanthracene, 2,3-dimethyl-9,10-dibenzyloxyanthracene, 9-benzyloxy-10-methylanthracene, 9,10-di-α-methylbenzyloxyanthracene, 2-ethyl-9,10-di-α-methylbenzyloxyanthracene, 2-t-butyl-9,10-di-α-methylbenzyloxyanthracene, 2,3-dimethyl-9,10-di-α-methylbenzyloxyanthracene, 9-(α-methylbenzyloxy)-10-methylanthracene, 9,10-di(2-hydroxyethoxy)anthracene, 2-ethyl-9,10-di(2-carboxyethoxy)anthracene; chrysene derivatives such as 1,4-dimethoxychrysene, 1,4-diethoxchrysene, 1,4-dipropoxychrysene, 1,4-dibenzyloxychrysene and 1,4-di-α-methylbenzyloxychrysene; and phenanthrene derivatives such as 9-hydroxyphenanthrene, 9,10-dimethoxyphenanthrene and 9,10-diethoxphenanthrene. Among these derivatives, 9,10-dimethoxyanthracene derivatives which may have an alkyl group of a carbon atom number of 1-4 as a substituent is especially preferable, and a methoxy group and an ethoxy group are desirable as an alkoxy group.

Moreover, as thioxanthone derivatives, there can be cited, for example, thioxanthone, 2,4-dimethylthioxanthone, 2,4-diethylthioxanthone, isopropylthioxanthone and 2-chlorothioxanthone.

(Initiator Aid)

An initiator aid is a substance acting as a sensitizing dye which supplies an initiator with energy through electron release, electronic attraction, or generation of heat by optical irradiation, and raises generation efficiency of a radical or an acid from an initiator, and it is applied by combining with an initiator.

Examples of an initiator aid which can be applied are: xanthene, thioxanthone dye, ketocoumarin, thioxanthene dye, cyanine, phthalocyanine, merocyanine, porphyrin, spiro compound, ferrocene, fluorene, fulgide, imidazole, perylene, phenazine, phenothiazine, polyene, azo compound, diphenylmethane, triphenylmethane, polymethine acridine, coumarin, ketocoumarin, quinacridone, indigo, styryl, pyrylium compound, pyrromethene compound, pyrazolo triazole compound, benzothiazole compound, barbituric acid derivative and thiobarbituric acid derivative.

Further, as an initiator aid, it may apply the substances which are well-known to act as a sensitizing dye in "Development Technology in Additive for Polymer" (supervised by Yasukazu OKATSU, CMC Publishing, Co.), besides the above-mentioned compounds. In addition, an initiator aid can also be considered to be a compositional element which forms a pat of photopolymerization initiator.

In addition to these photoinitiators, it is possible to add an accelerating aid to accelerate a photopolymerization (curing) reaction. Examples of an accelerating aid include: p-dimethylaminoethyl benzoate, p-dimethylaminoisoamyl benzoate, ethanolamine, diethanolamine and triethanolamine.

It is well known the following combination examples of a radical polymerization initiator and an initiation aid which are applied to a radical polymerizable composition: a combination of peroxy acid ester which is a radical polymerization initiator, and xanthene, thioxanthone dye, ketocoumarin or thiopyrylium salt which is an initiator aid; and a combination of an onium salt such as diphenyliodonium salt which is a radical polymerization initiator, and thioxanthene dye which is an initiator aid.

Moreover, when titanocene is applied as a radical polymerization initiator, the following compounds can be applied as an initiator aid by which wave length sensitization of the titanocene is carried out from a visible radiation to a near-infrared radiation corresponding to a laser or LED. Examples which can be applied are: cyanine, phthalocyanine, merocyanine, porphyrin, spiro compound, ferrocene, fluorene, fulgide, imidazole, perylene, phenazine, phenothiazine, polyene, azo compound, diphenylmethane, tiphenylmethane, polymethine acridine, coumarin, keto coumarin, quinacridone, indigo, styryl, pyrylium compound, pyrromethene compound, pyrazolo triazole compound, benzothiazole compound, barbituric acid derivative, and thiobarbituric acid derivative.

As an initiator aid used in combining with titanocene, it is also applicable the following compounds disclosed in European Patent No. 568,993, U.S. Pat. No. 4,508,811, U.S. Pat. No. 5,227,227, JP-A No. 2001-125255 and JP-A No. 11-271969. A specific example of a combination of a radical polymerization initiator of such titanocene and an initiator aid is cited a combination disclosed in JP-A No. 2001-125255 and JP-A No. 11-271969.

[Coloring Material]

A pigment or a dye can be used for the coloring material used for the active energy ray curable ink relating to the present invention. It is preferable to use a pigment from the viewpoint of the weatherproofing of an image.

Pigments which can be preferably used in the present invention are enumerated below.

C. I. Pigment Yellow 1, 2, 3, 12, 13, 14, 16, 17, 73, 74, 75, 81, 83, 87, 93, 95, 97, 98, 109, 114, 120, 128, 129, 138, 150, and 151, 154, 180, 185;

C. I. Pigment Red 5, 7, 12, 22, and 38, 48:1, 48:2, 48:4, 49:1, 53:1, 57:1, 63:1, 101, 112, 122, 123, 144, 146 and 168, 184, 185, 202;

C. I. Pigment Violet 19, 23;

C. L Pigment Blue 1, 2, and 3, 15:1, 15:2, 15:3, 15:4, 18, 22, 27, 29, 60;

C. I. Pigment Green 7, 36;

C. I. Pigment White 6, 18, and 21; and

C. I. Pigment Black 7

The following mixers can be used for dispersing the above-mentioned pigment, for example, ball mill, sand mill, attritor, roll mill, agitator, Henschel mixer, colloid mill, ultrasonic homogenizer, pearl mill, wet jet mill and paint shaker. Further, when dispersing a pigment, it is also possible to add a dispersing agent. As a dispersing agent, it is preferable to use a polymer dispersing agent, and the SolspeRse series of Avecia Co., and PB series of Ajinomoto-Fine-Techno Co., Inc. are cited as a polymer dispersing agent. Moreover, it is also possible to use a synergist according to various pigments as a dispersing aid. As for these dispersing agents and dispersing aids, it is preferable that 1-50 weight parts are added to 100 weight parts of the pigment. Although it is performed using a solvent or a polymerizable compound as a dispersion medium, in order to allow to react and cure immediately after ink impact, it is preferable that the radiation curable ink used in the present invention does not contain a solvent. If a solvent remains in a cured image, there will arise the problem of deterioration of solvent resistance and VOC of the solvent which remains. Therefore, it is preferable to choose a polymerizable compound instead of a solvent, and especially, it is preferable to choose a monomer having a lowest viscosity from the viewpoint of dispersion aptitude.

As for dispersing of a pigment, it is preferable that the mean particle diameter of pigment particles shall be 0.08 to 0.2 μm, and it is suitably selected the pigment, the dispersing agent, and the dispersion medium, dispersion conditions, and filtration conditions so that a maximum grain size is set up to be 0.3 to 10 μm, and more preferable to be 0.3 to 3 μm. By this particle size control, clogging of a head nozzle can be controlled and the storage stability, ink transparency, and cure sensitivity of the ink can be maintained.

The density of the coloring material in the ink of the present invention is preferably 1 to 30 weight % based on the total weight of the ink. In the inks other than a white ink, it is more preferably 1 to 10 weight %.

[Other Additives]

In the ink relating to the present invention, it can be added a polymerization inhibitor in an amount of 200-20000 ppm from the viewpoint of improving conservation.

As for the ink relating to the present invention, since it is preferable to heat the ink in the range of 40-80° C. so that it becomes low viscosity for ejection, it is preferable to incorporate a polymerization inhibitor in order to prevent the head clogging by thermal polymerization.

In addition, the following can be added according to necessity: a surfactant, an additive for leveling, a matting agent, a polyester resin for adjusting surface properties, a polyurethane resin, a vinyl resin, an acrylic resin, a rubber resin and a wax.

The viscosity at 25° C. is preferably 25 mPa·s to 500 mPa·s from the ease of carrying out of fixation of the droplet after impact, and the viscosity at the time of the ejection of the ink is, and the viscosity at the time of the discharge is preferably 8 mPa·s to 20 mPa·s from the driving voltage at the time of ejection of the ink and stability. The free surface tension of the ink is preferably 30 mN/m or less, since the shrinking of the impacted ink is small and the drawing nature of the contour of a line is good.

From the viewpoints of small shrinking of the impacted ink due to liquid slippage, good drawing nature of the contour of a line, and easy fixing on the recording medium, the contact angle with the recording medium is preferably 10 to 30° as mentioned-above.

In the present embodiment, although image recording shall be performed using the ink cured by irradiating with a UV light, the ink of the present invention is not necessarily limited to this. For example, it may be an ink curable by irradiating with an active energy ray other than the UV light such as an electron beam, electromagnetic waves of an X-ray, a visible ray and infrared ray. In this case, the polymerizable compound polymerized to be cured by an active energy ray other than the UV light, and the photoinitiator which makes the polymerization reaction of polymerizable compounds start by the activation energy ray other than the UV light are applied to the ink. Moreover, when using the ink of the photocurable ink cured by an active energy ray other than the UV light, the light source which emits that activate energy ray is applied in place of the UV ray source.

As specific examples of an ink ejection mode of ink droplets of an ink-jet head 12, there can be cited the followings: an electric-mechanic conversion mode (for example, a single cavity type, a double cavity type, a vendor type, a piston type, a shear mode type and a sheared-wall type); an electro-thermal conversion mode (for example, a thermal ink-jet type and a Bubble Jet™ type); an electrostatic suction mode (for example, an electric field control type and a slit jet type); and a discharge mode (for example, a spark jet type). Although the present invention may employ any ink ejection modes, especially a shear mode type that is disclosed in JP-A No. 2004-122760 is preferable. As a driving wave shape, it is preferable so called DRR driving method in which the volume of a pressure room is made to return after expanding and holding the volume for a predetermined time, followed by making to the volume of the pressure room to return after shrinking and holding the volume for a predetermined time.

Next, the "recording medium" used for the present embodiment will be described.

As a recording medium used in the present embodiment, it can be applicable the recording media used for a conventional ink-jet recording device. Examples of the recoding media are: a plain paper, a recycled paper, and a glossy paper, various cloths, various non-woven fabrics, a resin, a metal and a glass. As a shape of a recording medium, a rolled form, a cut sheet form and, a tabular shape are applicable. Furthermore, well known well-known recording media such as various papers covered with a resin on a recording side, a film containing a pigment, an opaque film such as a foamed film are also applicable as a recording medium used in the present embodiment.

Moreover, as a rough indication, guide of "being a substantially non-ink-absorbing recording medium" of the present invention by which especially the effect is demonstrated notably in the composition of the present invention, the analytical method by the two following benchmarks can be taken suitably:

(1) no penetration of ink deeper than 2 μm in the depth to the recording medium; and
(2) does not disappear within 5 seconds a portion of 20% or more of the ink droplets of 50 pL jetted on the surface of the recording medium. When at least one of these is satisfied is meant the above-case. In order to determine whether a recording medium is contained in either of the above-mentioned benchmarks, or both, the person skilled in the art can use a standard analytical method. For example, after jetting an ink on a surface of the recording medium, a cut piece of the recording medium is taken, and it is inspected with a transparent electron microscope to determined whether the depth of penetration of the ink is larger than 2 μm, and whether the ink has disappeared.

Thus, a suitable analytical method can be taken.

Examples of the recording medium which is substantially non-ink-absorbing and used in the present invention are cited as: an art paper, a synthetic resin, a rubber, a resin coated paper, glass, metal, earthenware, wood finished with a surface treatment. Moreover, in the present invention, for the purpose of adding a functional, it can also be used a composite recording medium by combining a plurality of these materials. What can be used is a recording medium in which an amount of the ink which permeates to the bottom from the printed surface of the recording medium is substantially small, and a support on which a UV curable ink is generally printed in the market is also included.

Although any kinds of synthetic resins and resin films processed for printing can also be used as the above-mentioned synthetic resins, the following materials are cited, for example: polyesters such as polyethylene terephthalate and polybutadiene terephthalate, polyolefins such as polyvinyl chloride, polystyrene, polyethylene, polyurethane and polypropylene, acrylic resin, polycarbonate, acrylonitrile-butadiene-styrene copolymer, diacetate, triacetate, polyimide, cellophane and celluloid. As a thickness and a form of a recording medium at the time of using a synthetic resin, it is not particularly limited. Any forms of a film shape, a label shape, a card shape, and a block shape may be used, and it may be transparent or opaque.

As a using form of the above-mentioned synthetic resins, it is also preferable to use in the shape of a film used for so called a flexible packaging, and it is possible to use several kinds of plastics and their films which are non-absorbing. Examples of a plastic film are cited as: a PET film, an OPS film, an OPP film, a PNy film, a PVC film, a PE film, a TAC film and a PP film. Examples of other plastics which can be used are: polycarbonate, acryl resin, ABS, polyacetal, PVA and rubbers.

As the above-mentioned resin coat paper, for example, a transparent polyester film, an opaque polyester film, an opaque polyolefin resin film and a paper support which is laminated with a transparent polyolefin resin on both surfaces are cited. Especially preferred is a paper support which is laminated with a transparent polyolefin resin on both surfaces. Further, as a synthetic paper system, it can be cited Yupo, Peach coat, Karel and Over paper.

As the above-mentioned metal, there is no restriction in particular, it is suitably used, for example, aluminium, iron, gold, silver, copper, nickel, titanium, chromium, molybdenum, silicon, lead, zinc, stainless and composite materials of these.

Furthermore, it is also possible to use a read only optical disk such as CD-ROM and DVD-ROM, a recordable optical disk such as CD-R and DVD-R, and an rewritable optical disk. Ink-jet recording can be carried out on the label side thereof.

EXAMPLES

Hereafter, although the effects of the present invention will be illustrated based on the examples, the present invention is not limited to these.
<Ink>
A cationic polymerizable UV curable ink was used as an ink. The viscosities were 5 mPa·s and 10 mPa·s for Y, M, C and K each color (measured value at 50° C.), and the surface tension was about 28 dyn/cm$^2$ (measured value at 25° C.).

In addition, although "parts" or "%" is used in the following experimental description, as long as there is no notice in particular, they represent respectively "weight parts" or "weight %".
<<Preparation of Dispersion Liquid>>
[Preparation of Dispersion Liquid A]

The following compounds each were put into a stainless steel beaker, and they were stirred to melt for 1 hour, while heated on a hot plate at 65° C.

PB821  9 parts
(dispersing agent, made by Ajinomoto Fine-Techno Co., Inc.)
OXT221 (oxetane compound, made by Toagosei Co., Ltd.)  71 parts After cooling to room temperature, 20 parts of Pigment Black 7 (#52 made by Mitsubishi Chemical Co., Ltd)) were added to this. Then the mixture was placed in a glass bottle with 200 g of zirconia beads having a diameter of 0.3 mm and the mixture was tightly stopped and carrying out dispersion processing with a paint shaker for 4 hours. Then the zirconia beads were removed and Dispersion liquid A was prepared.
[Preparation of Dispersion Liquids B to D]

Dispersion liquid B, Dispersion liquid C, and Dispersion liquid D each were prepared in the same manner as preparation of the above-described Dispersion A except that Pigment Black 7 was replaced respectively with Pigment Blue 15: 4 (Cyanine Blue 4044, made by the Sanyo Color Works, Ltd.), Pigment Red 122 (CFR321, made by Dainichiseika Color & Chemicals Mfg. Co., Ltd.) and Pigment Yellow 180 (CFY313-2, made by Dainichiseika Color & Chemicals Mfg. Co., Ltd.).
<<Preparation of Ink Set>>
[Preparation of Ink Set]

K, C, M and Y inks each were respectively prepared using the above-prepared Dispersion liquids A to D (cationic polymerizable compounds). These inks have a composition as described in Table 1 and they formed Ink set.

TABLE 1

| | | | | Ink composition (weight parts) | | | | | |
|---|---|---|---|---|---|---|---|---|---|
| | | Coloring material | | Polymerizable compound | | | | Photopolymerization initiator group | |
| | | Pigment dispersion liquid | | (Cationic polymerizable) | | Modified silicone oil | Photopolymerization initiator | Sensitizer | |
| | Kind of ink | Name | Added amount | 2021P | OXT221 | OXT212 | SDX-1843 | UVI6992 | CPTX | AHC |
| Ink set | K | A | 14.0 | 20.0 | 43.9 | 15.0 | 0.1 | 5.0 | 2.0 | — |
| | C | B | 14.0 | 20.0 | 43.9 | 15.0 | 0.1 | 5.0 | 2.0 | — |
| | M | C | 14.0 | 20.0 | 43.9 | 15.0 | 0.1 | 5.0 | 2.0 | — |
| | Y | D | 14.0 | 20.0 | 43.9 | 15.0 | 0.1 | 5.0 | — | 2.0 |

Here, the numerical values described in the above Table 1 represent weight parts.

The details of the compounds each given an abbreviated name in Table are as follows.
<Cationic Polymerizable Compound>
2021P: Seloxide 2021P (a bi-functional alicyclic epoxy compound, made by Daicel Chemical Industries, Ltd.)
OXT212: Mono-functional oxetane compound, made by the Toagosei Co., Ltd.
OXT221: Bi-functional oxetane compound, made by the Toagosei Co., Ltd.
<Modified Silicone Oil>
SDX-1843: Modified silicone oil SDX-1843, made by Adeka Corporation
<Photopolymerization Initiator>
UV16992: Triaryl sulfonium salt UV16992, made by Dow Chemical Company
<Sensitizer>
CPTX: 1-Chloro-4-propoxythioxanthone
AHC: 3-Acetyl-7-hydroxycoumarin <Recording Medium>

Yupo (UV) PA-T1 made by Lintec Corporation was used as a recording medium

<Ink-Jet Head>

For each color, there were prepared two heads of a shear mode type (AL=3 μsec, nozzle pitch: 180 dpi, nozzle number: 256, nozzle taper angle: 6 degree, nozzle diameter: 26 μm, and ink droplet size: 7 pl). The nozzle row of each head was shifted ½ pitch mutually, and the heads were pasted together so that they might form a staggered conformation. Since each head was a head of 180 dpi, the recording head of 360 dpi was produced by shifting the nozzle pitch by ½ mutually. Evaluation was made by jetting with the driving cycle of 22 kHz in 3 Cycle driving using the DRR drive wave form.

<Ink-Jet Recording Device>

The above-described inks were loaded in the ink-jet recording device of a single pass mode provided with a head of a shear mode type as described in FIG. 1. The ink was jetted on the recording medium conveyed with the transportation speed of 200 mm/sec to form an image.

As an energy ray irradiation device for curing, a low-pressure mercury lamp was used for semi-curing light sources 16A to 16D to semi-cure, and a high-pressure mercury lamp was used for complete-curing light source 18 for complete curing. The amount of irradiation energy of the semi-curing light source 16D was set to be 10 mJ/cm$^2$, and the amount of irradiation energy of the complete-curing light source 18 was set to be 300 mJ/cm$^2$.

Image Formation and Evaluation

Examples 1 to 4 and Comparative Examples 1 to 3

Each evaluation shown below was performed with respect to each image formed as shown below.

<Uneven Density>

First, a solid image of C ink was directly printed on the above-mentioned recording medium with 360 dpi. The formed image was semi-cured with the semi-curing light source 16C by changing the amount of the irradiation energy in the range of 3 to 1,000 mJ/cm$^2$. Subsequently, a solid image of K ink was printed, and afterwards, fixation and complete curing were performed to prepare a solid image of two superimposed colors of C+K. Uneven density of K image of the obtained solid image was investigated.

The criteria of judgment are as follows. "A" is desirable, although "B" is also practically acceptable.

A: An occurrence ratio is less than 5%.
B: An occurrence ratio is from 5 to 10%.
C: An occurrence ratio exceeds 10% and evaluation is impossible.

<Bleeding>

First, a solid image of C ink was directly printed on the above-mentioned recording medium with 360 dpi. The formed image was semi-cured with the semi-curing light source 16C by changing the amount of the irradiation energy in the range of 3 to 1,000 mJ/cm$^2$. Subsequently, a character and a line were printed with K ink, and afterwards, fixation and complete curing were performed to prepare an image. The existence of bleeding was visually evaluated.

Here, the criteria of judgment are as follows. "A" is desirable, although "B" is also practically acceptable.

A: An occurrence ratio is less than 5%.
B: An occurrence ratio is from 5 to 10%.
C: An occurrence ratio exceeds 10% and evaluation is impossible.

<Overall Rating>

The compatibility of bleeding and uneven density was evaluated as below from the object of the present invention.

Here, the criteria of judgment are as follows. "A" and "B" are desirable, although "C" is also practically acceptable.

A: Both bleeding and uneven density are classed as "A".
B: One of bleeding and uneven density is classed as "B" and the other is classed as "A".
C: Both bleeding and uneven density are classed as "B".
D: One of bleeding and uneven density is classed as "C".

<R0 and R>

R0 judgment pattern as shown in FIG. 3 was prepared with K ink, and the dot radius R0 of the K ink after complete curing was investigated. R judgment pattern as shown in FIG. 4 was prepared with C ink and K ink, and the dot radius R of the K ink after complete curing was investigated. The amount of irradiation energy of the semi-curing light source 16C was changed in the range of 3 to 1,000 mJ/cm$^2$ in the same manner as evaluation of bleeding and uneven density to semi-cure the ink.

Example 5

After printing R0 and R judgment prints, the controller was set with the target value of R/R0=0.67, and the controller controlled automatically. First, using the ink of Example 2, R0 and R judgment prints were printed. Then, they were automatically subjected to take pictures with a microscope in the judgment print measuring section 200A, and R0, R, and its ratio were measured. After that, it was acquired the correlation of the amount of irradiation energy of semi-curing and R/R0 shown in FIG. 7. And 10 mJ/cm$^2$ was automatically set up for the amount of irradiation energy of half-curing, and the same evaluations as Example 2 were performed.

Example 6

R0 and R judgment prints were printed. R0, R, and its ratio were measured in the same manner as in Example 5, except that the measurement was done by reading the R0 and R judgment prints with a scanner. After that, it was acquired the correlation of the amount of irradiation energy of semi-curing and R/R0 shown in FIG. 7. And 10 mJ/cm$^2$ automatically set up for the amount of irradiation energy of half-curing, and the same evaluations as Example 2 were performed.

The evaluation results are shown in Table 2.

TABLE 2

| | Viscosity of C ink (mPa·s) | Viscosity of K ink (mPa·s) | Irradiated energy amount of semi-curing light source 16C (mJ/cm$^2$) | Irradiated energy amount of semi-curing light source 16D (mJ/cm$^2$) | Irradiated energy amount of semi-curing light source 18 (mJ/cm$^2$) | R0 (μm) | R (μm) | R/R0 | Uneven density | Bleeding | Overall rating |
|---|---|---|---|---|---|---|---|---|---|---|---|
| Example 1 | 10 | 10 | 5 | 10 | 300 | 52 | 32 | 0.62 | B | A | B |
| Example 2 | 10 | 10 | 10 | 10 | 300 | 52 | 35 | 0.67 | B | A | B |
| Example 3 | 10 | 10 | 50 | 10 | 300 | 52 | 40 | 0.77 | A | A | A |

TABLE 2-continued

|  | Viscosity of C ink (mPa·s) | Viscosity of K ink (mPa·s) | Irradiated energy amount of semi-curing light source 16C (mJ/cm$^2$) | Irradiated energy amount of semi-curing light source 16D (mJ/cm$^2$) | Irradiated energy amount of semi-curing light source 18 (mJ/cm$^2$) | R0 (μm) | R (μm) | R/R0 | Uneven density | Bleeding | Overall rating |
|---|---|---|---|---|---|---|---|---|---|---|---|
| Example 4 | 10 | 10 | 100 | 10 | 300 | 52 | 43 | 0.83 | B | B | C |
| Example 5 | 10 | 10 | 10 | 10 | 300 | 52 | 35 | 0.67 | B | A | B |
| Example 6 | 10 | 10 | 10 | 10 | 300 | 52 | 35 | 0.67 | B | A | B |
| Comparative example 1 | 10 | 10 | 1000 | 10 | 300 | 52 | 48 | 0.92 | B | C | D |
| Comparative example 2 | 10 | 10 | 3 | 10 | 300 | 52 | 30 | 0.58 | C | B | D |
| Comparative example 3 | 10 | 5 | 100 | 10 | 300 | 52 | 49 | 0.94 | B | C | D |

As are clearly shown in Table 2, good print quality and good image quality with little image quality deterioration of uneven density and bleeding can be obtained with Examples 1 to 6 satisfying the conditional expression (1). Extremely excellent results were obtained with Examples 1 to 6.

The satisfactorily achievement of the effects of the present invention have been also confirmed with Examples 5 and 6 in which the amount of irradiation energy was set up automatically.

In addition, the same evaluations were performed for the combination of other colors such as Y+M (with semi-curing light source 16A) and M+C (with semi-curing light source 16B). There was no difference about uneven density and bleeding, and the achievement of the effects of the present invention has been confirmed.

DESCRIPTION OF SYMBOLS

10: Ink-jet recording device
12Y, 12C, 12M and 12K: Head
14: Ink storing/loading section
16, 16A, 16B, 16C and 16D: Semi-curing light source
18: Complete-curing light source
20: Recording medium
22: Paper supplying section
26: Suction belt conveying section
32: Magazine

The invention claimed is:

1. An ink-jet recording device comprising:
a conveying section which conveys a recording medium in a conveying direction;
a head section which is equipped with a plurality of full line type ink-jet heads arranged in the conveying direction of the recording medium, each ink-jet head jetting an active energy ray curable ink having a different color with each other to the recording medium; and
a semi-curing light source which is located between the ink-jet heads and semi-cures a first ink jetted from the inkjet head located in an upper stream of the conveying direction of the recording medium and landed on the recording medium before a second ink jetted from the ink-jet head located in a downstream of the conveying direction of the recording medium is landed on the first ink,
wherein the following conditional expression (1) is satisfied:

$$0.6 \leq R/R0 \leq 0.9, \quad \text{conditional expression (1)}$$

provided that: R is a dot radius of the second ink jetted on the first ink which is jetted on the recording medium and semi-cured; and R0 is a dot radius of the second ink directly jetted on the recording medium;
and wherein the ink-jet recording device further comprises:
a judgment print output device which outputs a judgment print produced by superimposing a dot image of the second ink on an image of the first ink having a plurality of areas which differ in an irradiation energy amount of the active energy ray with each other; and
an irradiation energy amount setting device which sets up one irradiation energy amount by selecting the one irradiation energy amount between the minimum amount and the maximum amount in a plurality of irradiation energy amounts used for producing the judgment print so that the conditional expression (1) is satisfied, the one irradiation energy amount being referred to at the time of recording.

2. The ink-jet recording device of claim 1,
wherein the judgment print contains a pattern having the plurality of areas located in the conveying direction of the recording medium, and the judgment print output device outputs the judgment print with a single pass by changing the irradiation energy amount while conveying the recording medium.

3. The ink-jet recording device of claim 1,
wherein the irradiation energy amount setting device reads the judgment print to set up the irradiation energy amount based on data of the dot radius R of the second ink.

4. The ink-jet recording device of claim 1,
wherein the active energy ray curable ink is a cationic polymerizable UV ray curable ink having a viscosity of 25 mPa·s to 500 mPa·s at 25° C. and having a viscosity of 8 mPa·s to 20 mPa·s at the time of being jetted.

5. The ink-jet recording device of claim 1,
wherein the irradiation energy amount of the active energy ray is set in the range of 5 mJ/cm$^2$ to 50 mJ/cm$^2$.

6. The ink-jet recording device of claim 1,
wherein the head section is equipped with three or more full line type ink-jet heads arranged in the conveying direction of the recording medium, each ink-jet head being capable of jetting an active energy ray curable ink having a different color with each other to the recording medium; and
the judgment print output device outputs the judgment print using the first ink jetted from the ink-jet head located in the upper stream of the conveying direction of the recording medium adjacent to the semi-curing light source, and the second ink jetted from the ink-jet head located in the downstream of the conveying direction of the recording medium adjacent to the semi-curing light source.

7. The ink-jet recording device of claim 1,
wherein the head section is equipped with three or more full line type ink-jet heads arranged in the conveying direction of the recording medium, each ink-jet head being capable of jetting an active energy ray curable ink having a different color with each other to the recording medium;
the semi-curing light source is arranged between the ink-jet heads of each color;
the judgment print output device outputs the judgment print, for each semi-curing light source, using the first ink jetted from the ink-jet head located in the upper stream of the conveying direction of the recording medium adjacent to the each semi-curing light source, and the second ink jetted from the ink-jet head located in the downstream of the conveying direction of the recording medium adjacent to the each semi-curing light source; and
the irradiation energy amount setting device sets up one irradiation energy amount by selecting the one irradiation energy amount between the minimum amount and the maximum amount in a plurality of irradiation energy amounts used for producing the judgment print for each semi-curing light source so that the conditional expression (1) is satisfied.

8. The ink-jet recording device of claim 1,
wherein the recording medium is a substantially non ink absorbing medium.

9. A method for forming an ink-jet image comprising the steps of:
jetting a first ink on a recording medium from a plurality of full line type ink-jet heads each jetting an active energy ray curable ink having a different color with each other;
irradiating the first ink landed on the recording medium with an active energy ray to semi-cure the first ink; and
jetting a second ink to land on the semi-cured first ink to form an image,
wherein the following conditional expression (1) is satisfied:

$$0.6 \leq R/R0 \leq 0.9, \quad \text{conditional expression (1)}$$

provided that: R is a dot radius of the second ink jetted on the first ink which is jetted on the recording medium and semi-cured; and R0 is a dot radius of the second ink directly jetted on the recording medium.

10. The method for forming an ink-jet image of claim 9, comprising the steps of:
outputting a judgment print which is produced by superimposing a dot image of the second ink on an image of the first ink having a plurality of areas which differ in an irradiation energy amount of the active energy ray with each other;
setting up one irradiation energy amount by selecting the one irradiation energy amount between the minimum amount and the maximum amount in a plurality of irradiation energy amounts used for producing the judgment print so that the conditional expression (1) is satisfied, the one irradiation energy amount being referred to at the time of recording;
producing an image by irradiating with the set one irradiation energy amount.

11. The method for forming an ink-jet image of claim 10,
wherein the judgment print contains a pattern having the plurality of areas located in the conveying direction of the recording medium, and the judgment print output device outputs the judgment print with a single pass by changing the irradiation energy amount while conveying the recording medium.

12. The method for forming an ink-jet image of claim 10,
wherein the one irradiation energy amount setting up step is carried out by reading the judgment print to set up the irradiation energy amount based on data of the dot radius R of the second ink.

13. The method for forming an ink-jet image of claim 9,
wherein the active energy ray curable ink is a cationic polymerizable UV ray curable ink having a viscosity of 25 mPa·s to 500 mPa·s at 25° C. and having a viscosity of 8 mPa·s to 20 mPa·s at the time of being jetted.

14. The method for forming an ink-jet image of claim 9,
wherein the irradiation energy amount of the active energy curing ray is set in the range of 5 mJ/cm$^2$ to 50 mJ/cm$^2$.

15. The method for forming an ink-jet image of claim 10,
wherein the ink-jet image is formed with three or more active energy ray curable inks; and
the judgment print is printed out by using the first ink used for image recording immediately before the semi-curing process and the second ink used for image recording immediately after the semi-curing process.

16. The method for forming an ink-jet image of claim 10,
wherein the ink-jet image is formed with three or more active energy ray curable inks;
the semi-curing process is carried out during the interval of the image recording of each color;
the judgment print output process is carried out for the each semi-curing process, by using the first ink used for image recording immediately before the semi-curing process and the second ink used for image recording immediately after the semi-curing process to print out the judgment print; and
the irradiation energy amount setting step sets up one irradiation energy amount by selecting the one irradiation energy amount between the minimum amount and the maximum amount in a plurality of irradiation energy amounts used for producing the judgment print for the each semi-curing process so that the conditional expression (1) is satisfied.

17. The method for forming an ink-jet image of claim 9,
wherein the recording medium is a substantially non ink absorbing medium.

* * * * *